(12) United States Patent
Hirono et al.

(10) Patent No.: US 11,317,044 B2
(45) Date of Patent: Apr. 26, 2022

(54) SOLID STATE IMAGING DEVICE AND METHOD OF CONTROLLING SOLID STATE IMAGING DEVICE

(71) Applicant: Sony Semiconductor Solutions Corporation, Kanagawa (JP)

(72) Inventors: Ryo Hirono, Kanagawa (JP); Yasushi Saito, Saitama (JP); Tomoya Takeda, Tokyo (JP); Hiroaki Ono, Kanagawa (JP)

(73) Assignee: Sony Semiconductor Solutions Corporation, Tokyo (JP)

( * ) Notice: Subject to any disclaimer, the term of this patent is extended or adjusted under 35 U.S.C. 154(b) by 0 days.

(21) Appl. No.: 16/605,362

(22) PCT Filed: Apr. 3, 2018

(86) PCT No.: PCT/JP2018/014212
§ 371 (c)(1),
(2) Date: Oct. 15, 2019

(87) PCT Pub. No.: WO2018/198690
PCT Pub. Date: Nov. 1, 2018

(65) Prior Publication Data
US 2020/0128203 A1 Apr. 23, 2020

(30) Foreign Application Priority Data
Apr. 27, 2017 (JP) .............................. JP2017-088649

(51) Int. Cl.
*H04N 5/3745* (2011.01)
*G06F 21/32* (2013.01)
(Continued)

(52) U.S. Cl.
CPC .......... *H04N 5/3745* (2013.01); *G06F 21/32* (2013.01); *H04N 5/23219* (2013.01);
(Continued)

(58) Field of Classification Search
CPC ............. H04N 5/3745; H04N 5/36961; H04N 5/23219; H04N 5/345; H04N 5/35536; G06F 21/32
See application file for complete search history.

(56) References Cited

U.S. PATENT DOCUMENTS

2010/0034529 A1* 2/2010 Jelinek .................... G02B 7/36
396/95
2015/0270307 A1* 9/2015 Umebayashi ..... H01L 27/14612
257/292
(Continued)

FOREIGN PATENT DOCUMENTS

JP 2005-244356 A 9/2005
JP 2007-093874 A 4/2007
(Continued)

OTHER PUBLICATIONS

Extended European Search Report dated Apr. 28, 2020 for corresponding European Application No. 18792131.7.
(Continued)

*Primary Examiner* — Ahmed A Berhan
(74) *Attorney, Agent, or Firm* — Michael Best & Friedrich LLP

(57) ABSTRACT

Provided is a solid state imaging device including: a pixel array in which pixels are disposed on a matrix; an iris authenticator that extracts iris information to be used in an iris authentication process, from image data obtained from the pixel array through photoelectric conversion; and an imaging condition controller that performs control to set an imaging condition in obtaining the image data for the iris authentication process, by using information obtained in a process of extracting the iris information.

20 Claims, 24 Drawing Sheets

(51) Int. Cl.
*H04N 5/345* (2011.01)
*H04N 5/355* (2011.01)
*H04N 5/369* (2011.01)
*H04N 5/232* (2006.01)

(52) U.S. Cl.
CPC ......... *H04N 5/345* (2013.01); *H04N 5/35536* (2013.01); *H04N 5/36961* (2018.08)

(56) References Cited

U.S. PATENT DOCUMENTS

2017/0091548 A1* 3/2017 Agrawal ................ G06K 9/209
2018/0165517 A1* 6/2018 Lee ...................... G06K 9/0061

FOREIGN PATENT DOCUMENTS

| JP | 2009-205576 | A |   | 9/2009 |
|----|------------|---|---|--------|
| JP | 2009205576 | A | * | 9/2009 |
| JP | 2015-170099 | A |   | 9/2015 |
| WO | 2015/127313 | A1 |   | 8/2015 |
| WO | 32970215 | A1 |   | 8/2015 |
| WO | 2016/185901 | A1 |   | 11/2016 |

OTHER PUBLICATIONS

European Patent Office Communication Pursuant to Article 94(3) EPC dated Jan. 15, 2021 for corresponding European Application No. 18792131.7.

* cited by examiner

[ FIG.1 ]
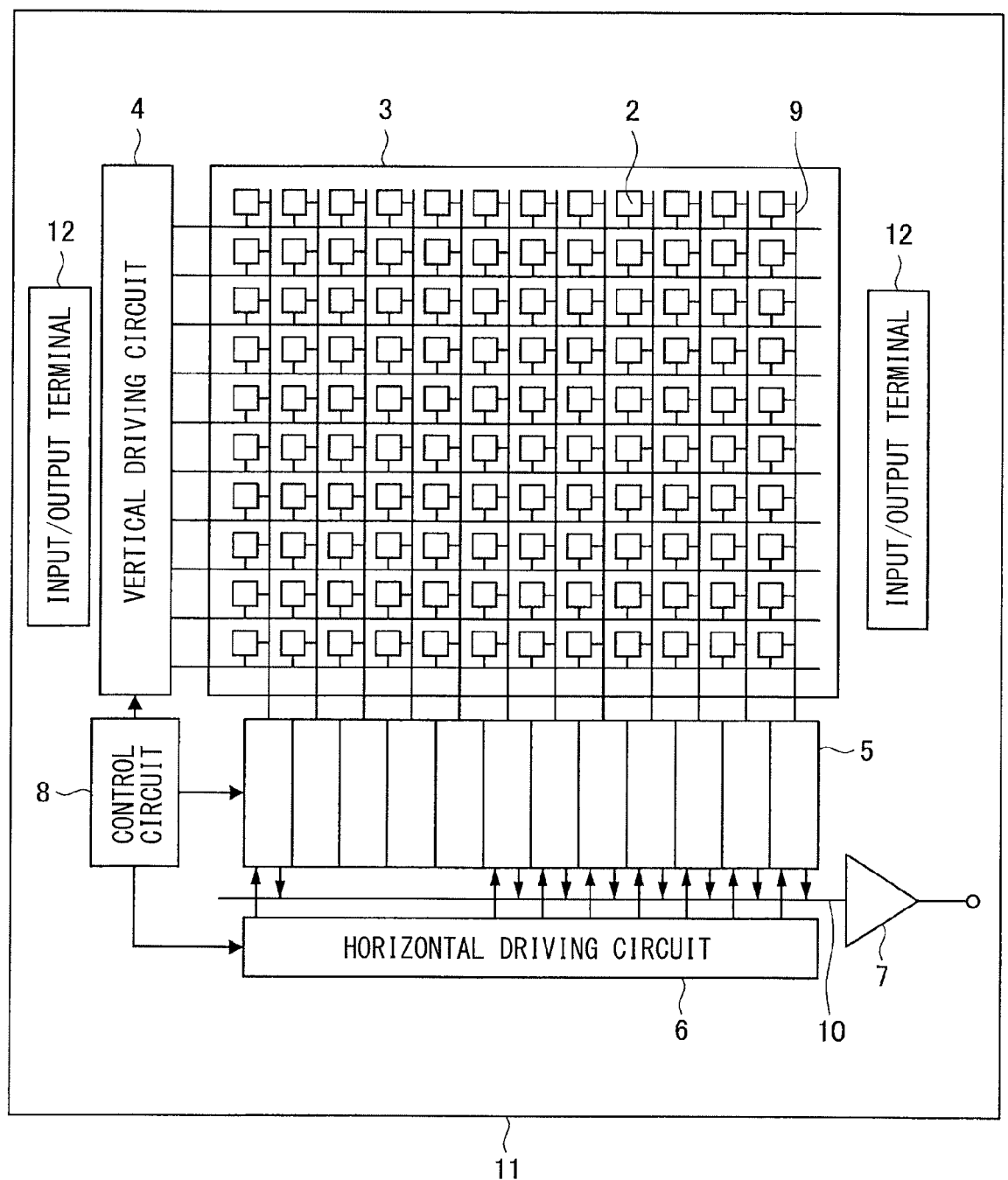

[FIG. 2]
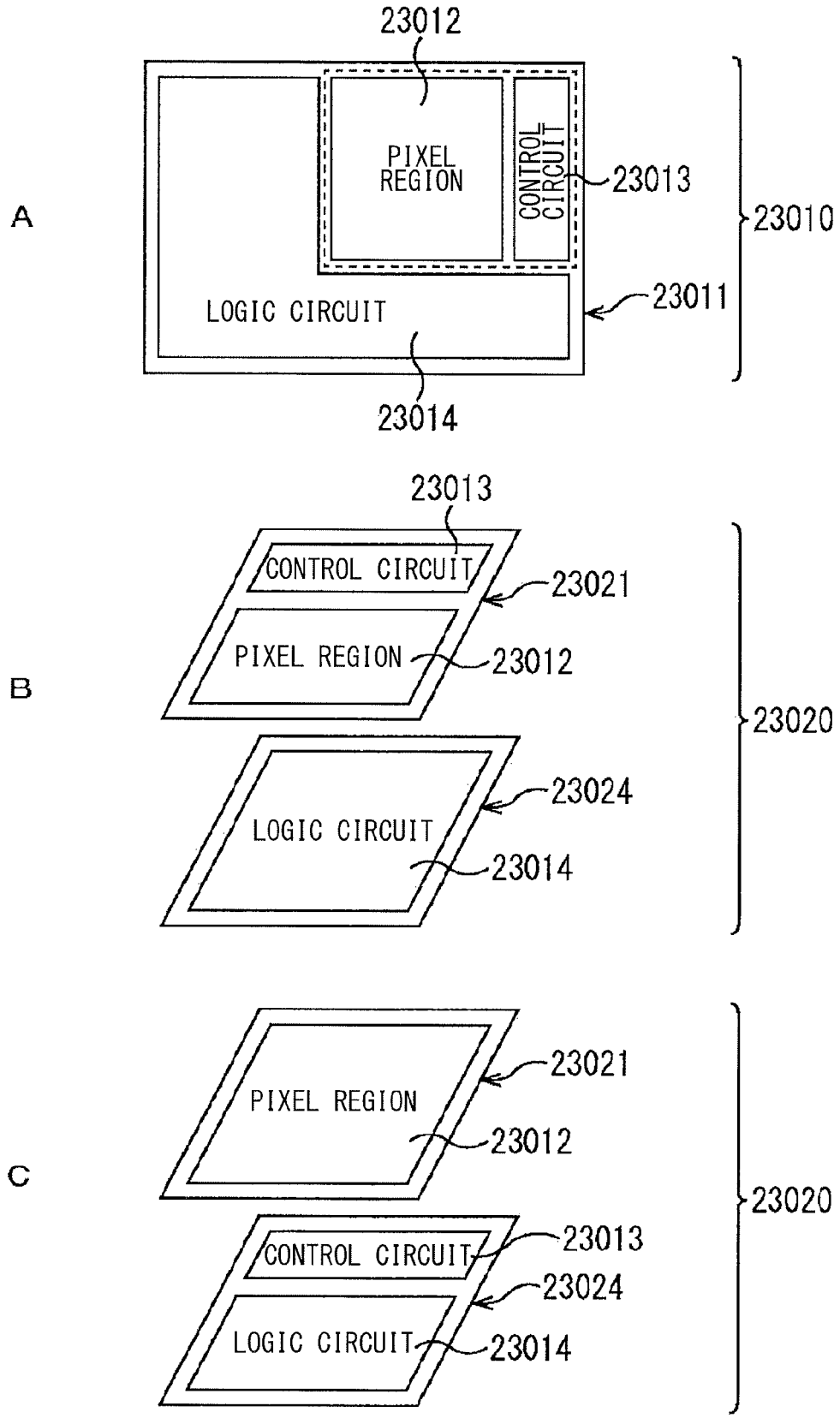

[FIG. 3]
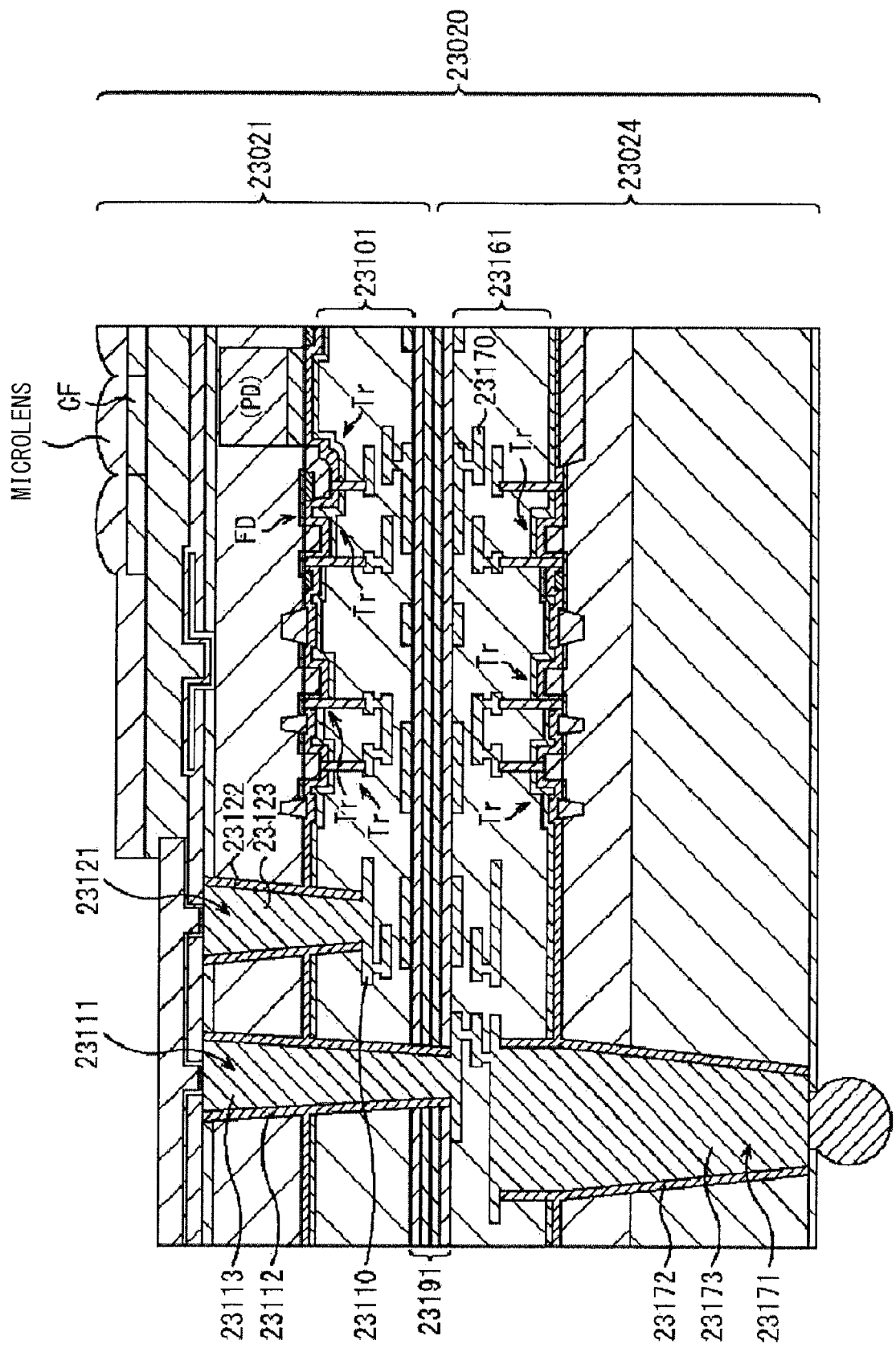

[FIG.4]
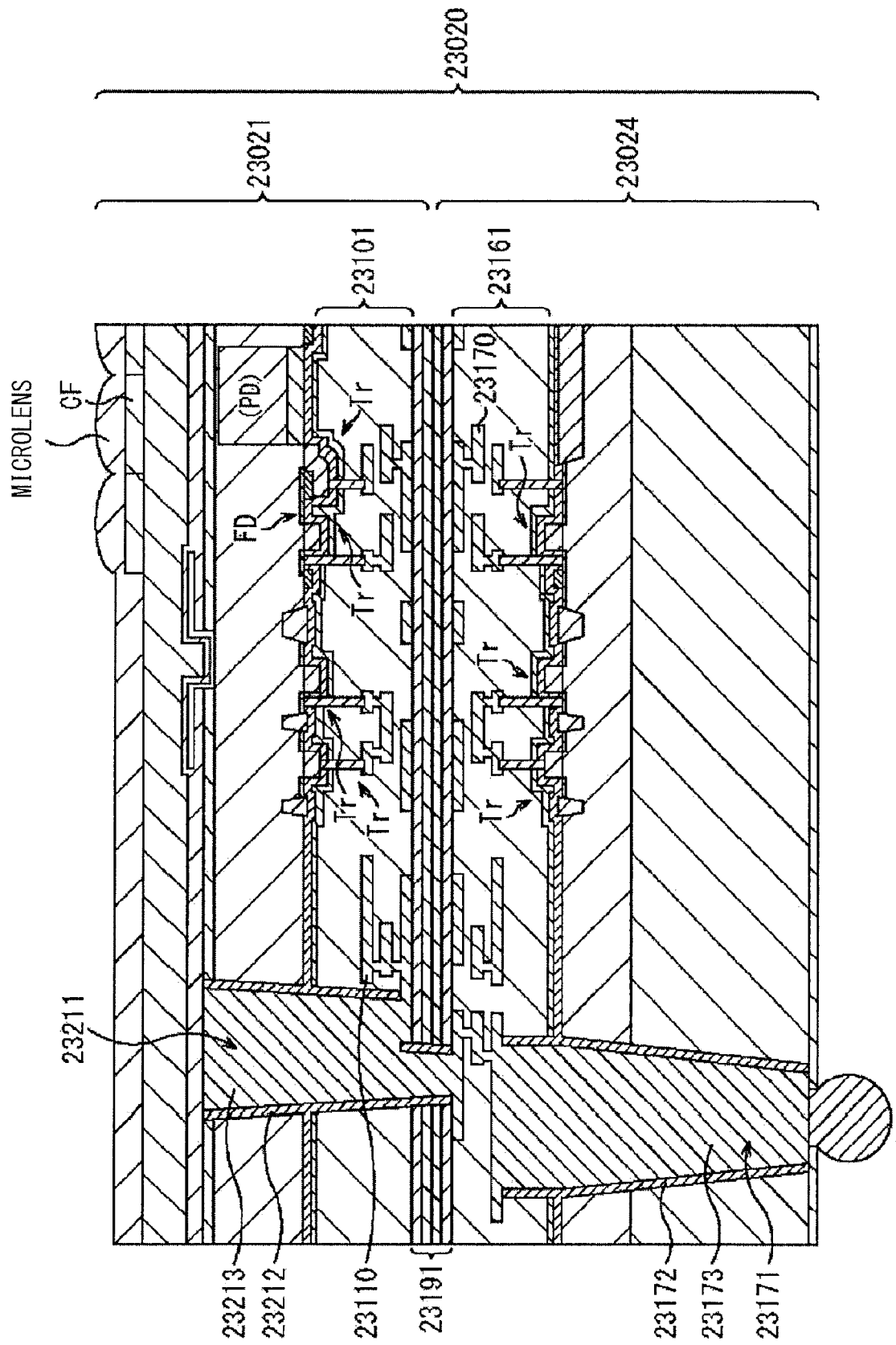

[ FIG. 5 ]
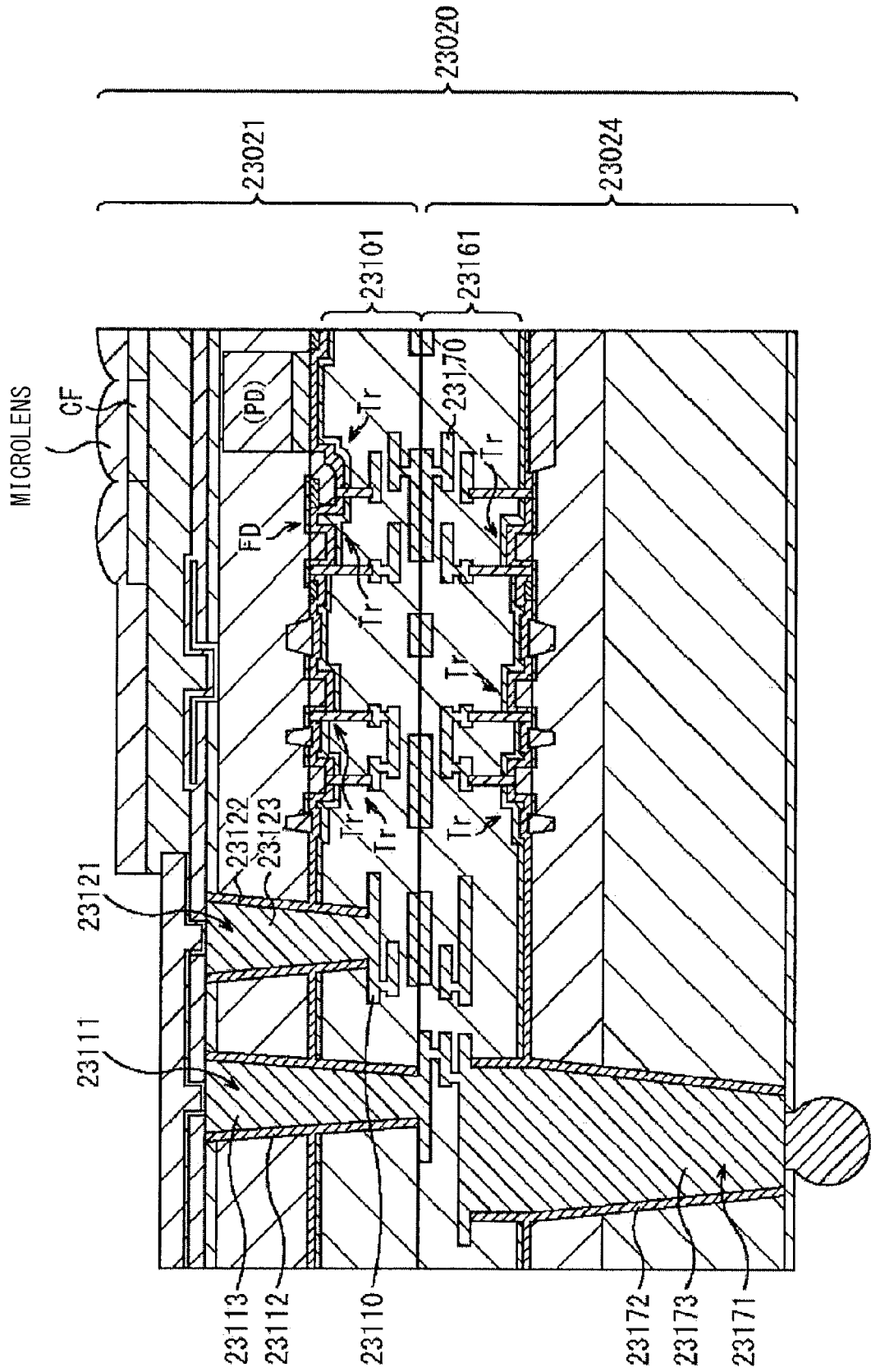

[FIG.6]
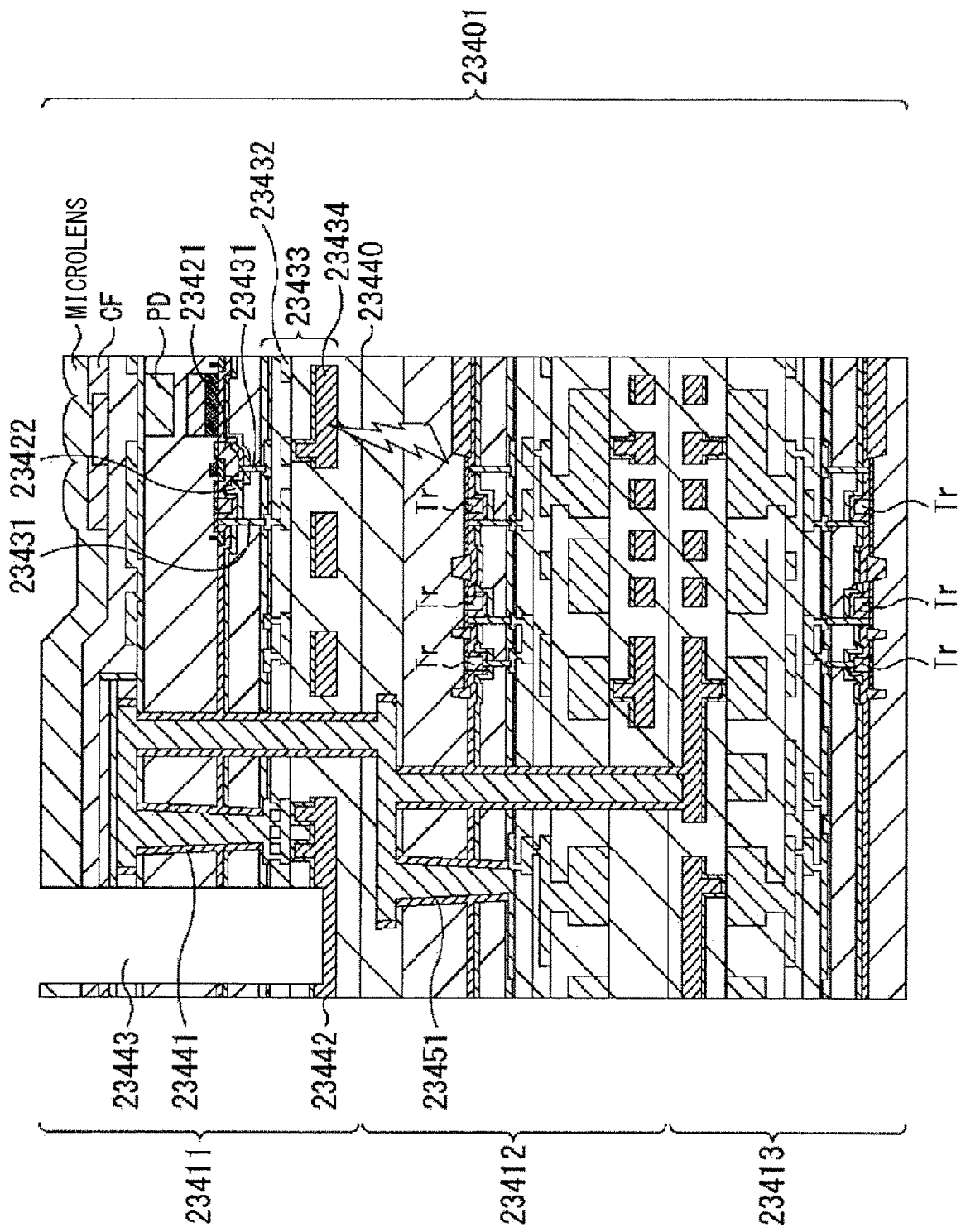

[FIG. 7]
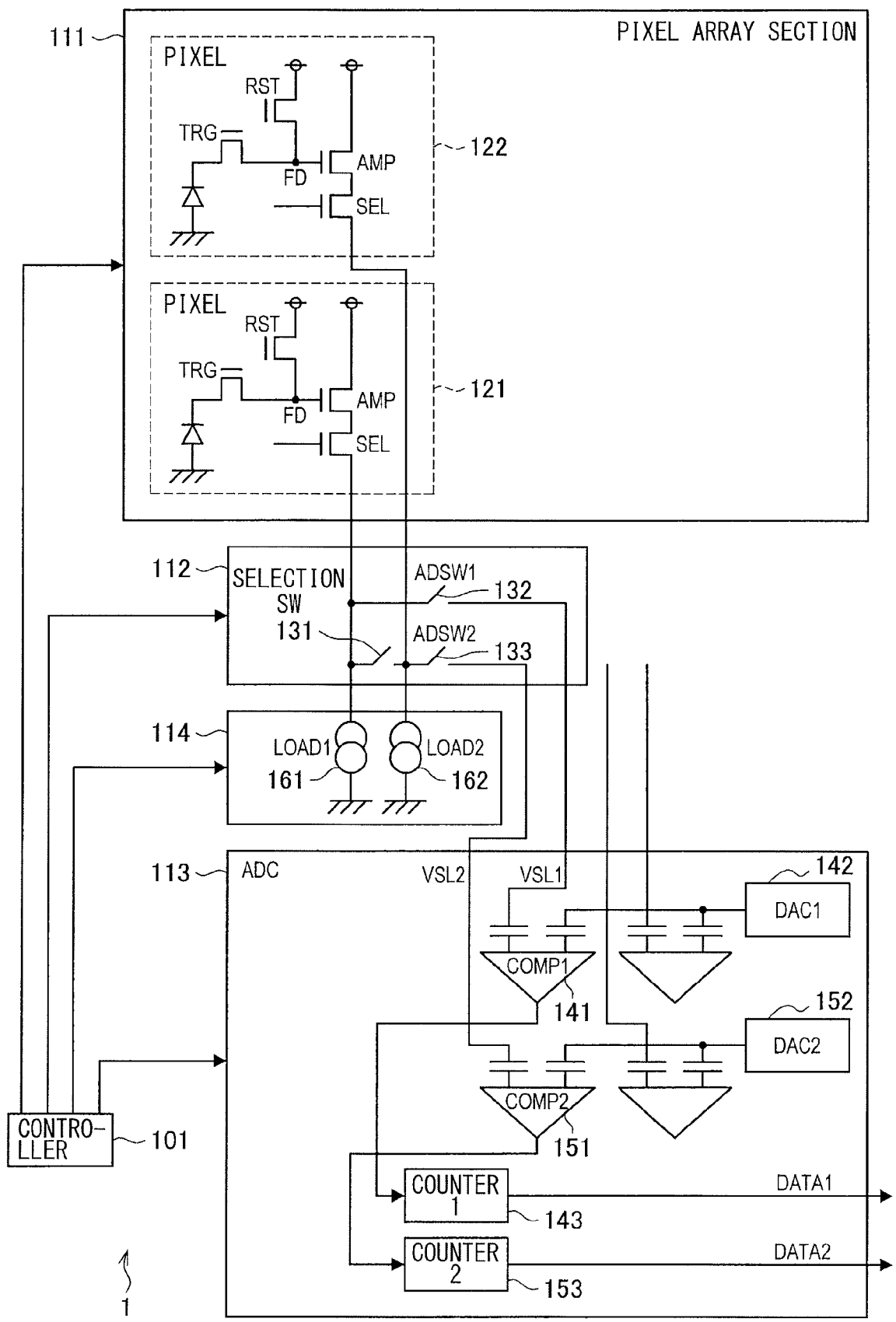

[FIG. 8]
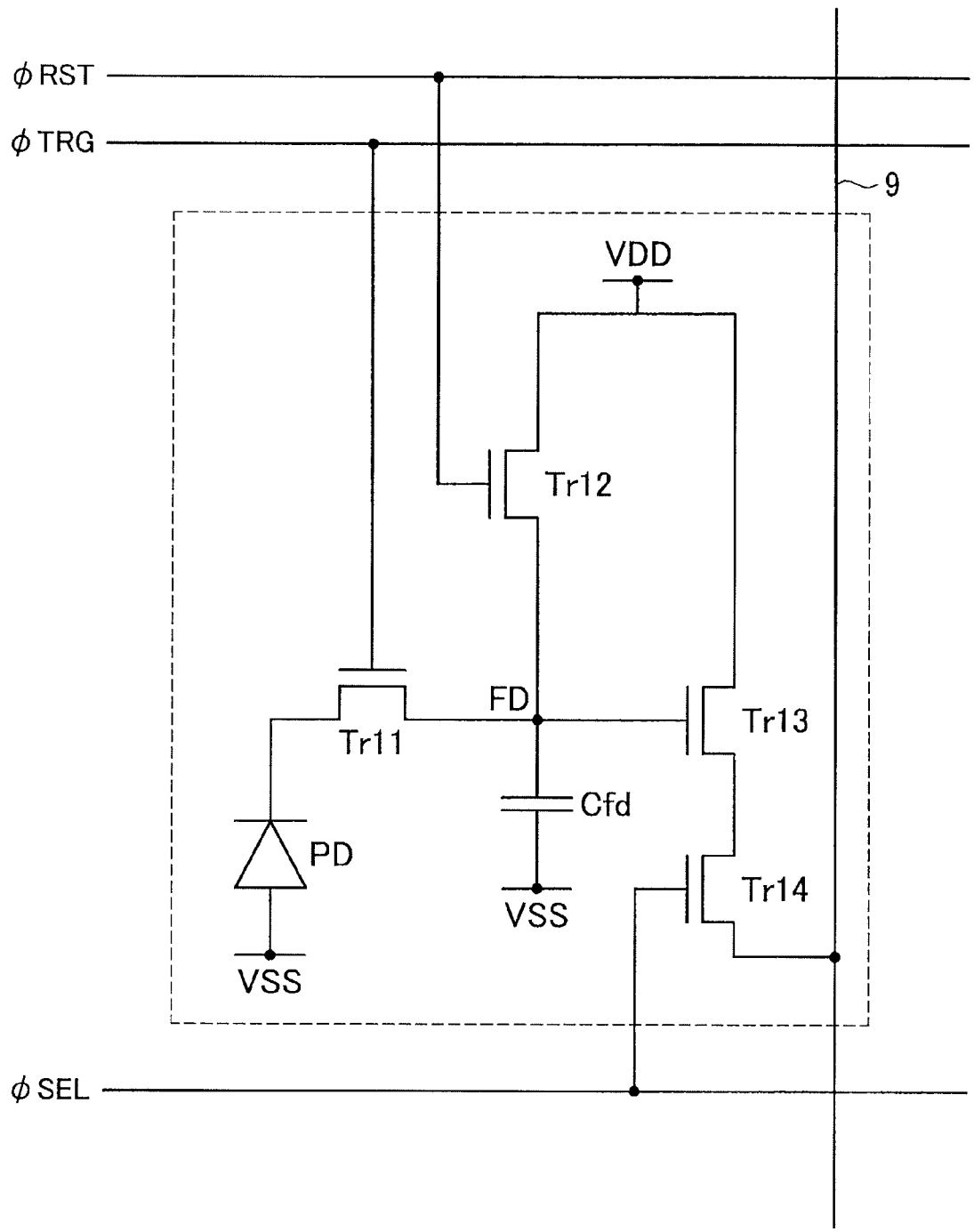

[FIG. 9]
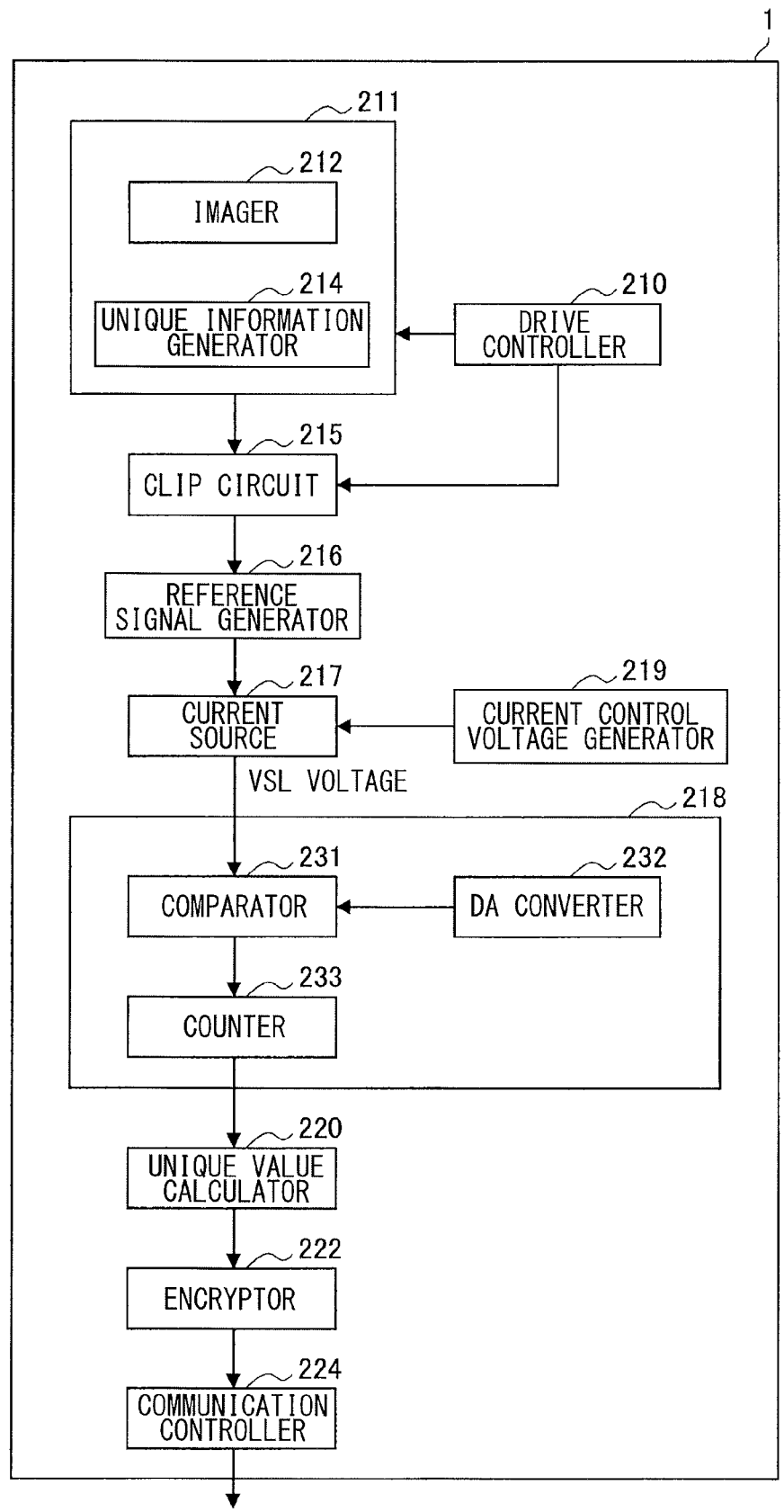

[ FIG. 10A ]
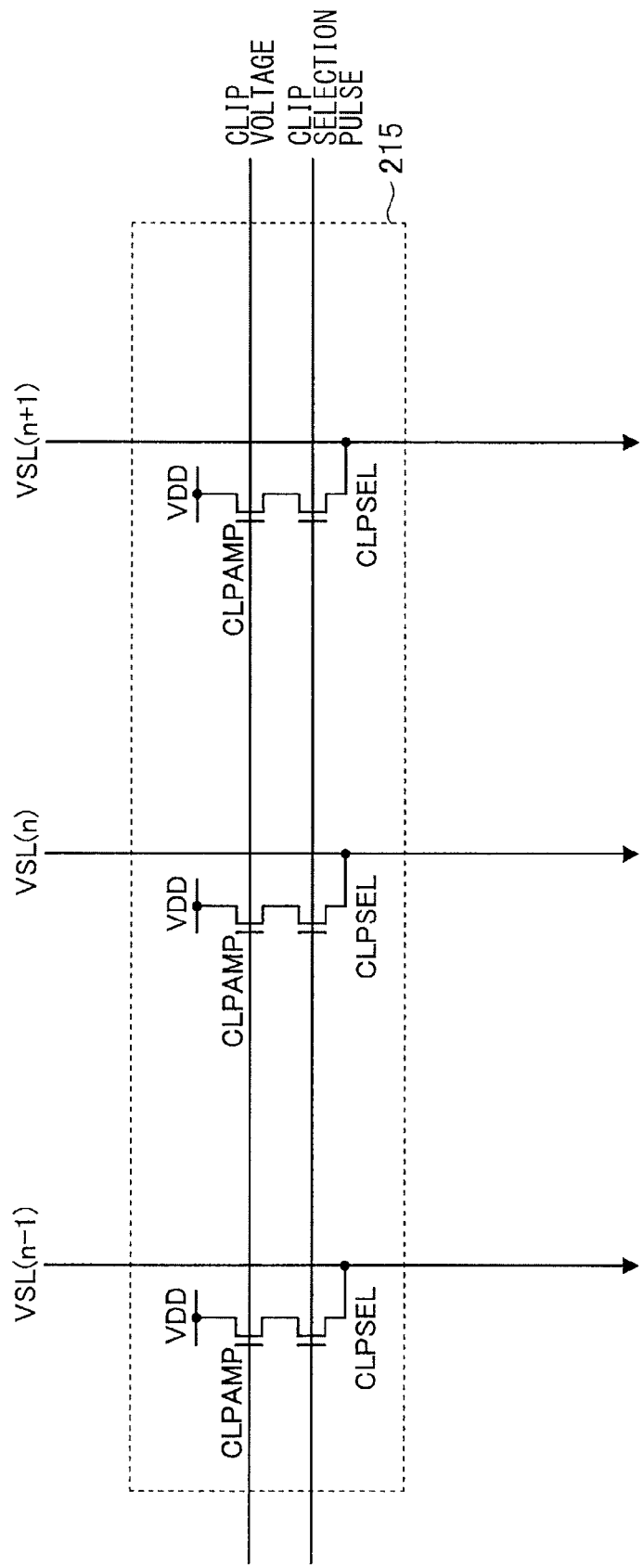

[FIG.10B]
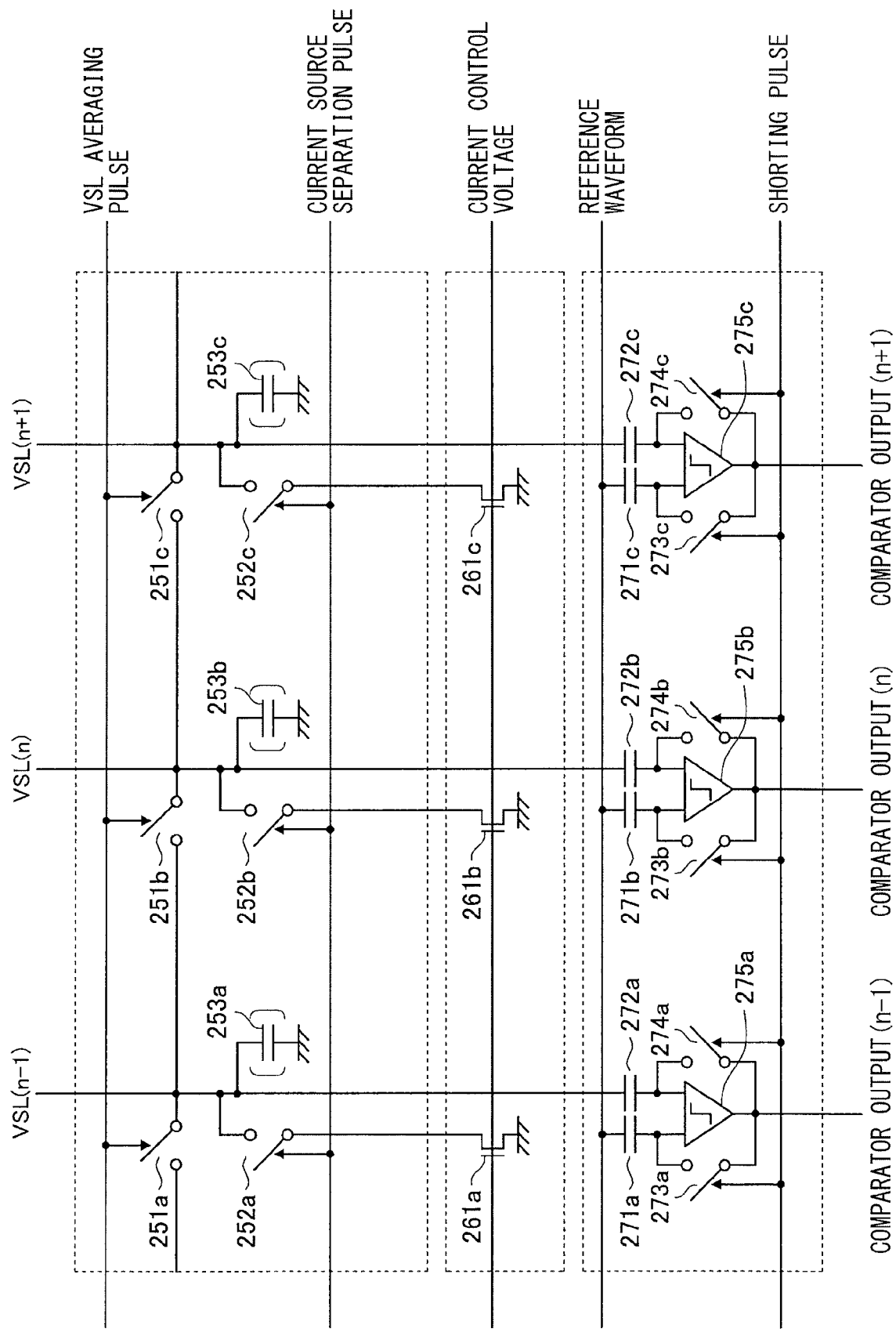

[ FIG. 11 ]
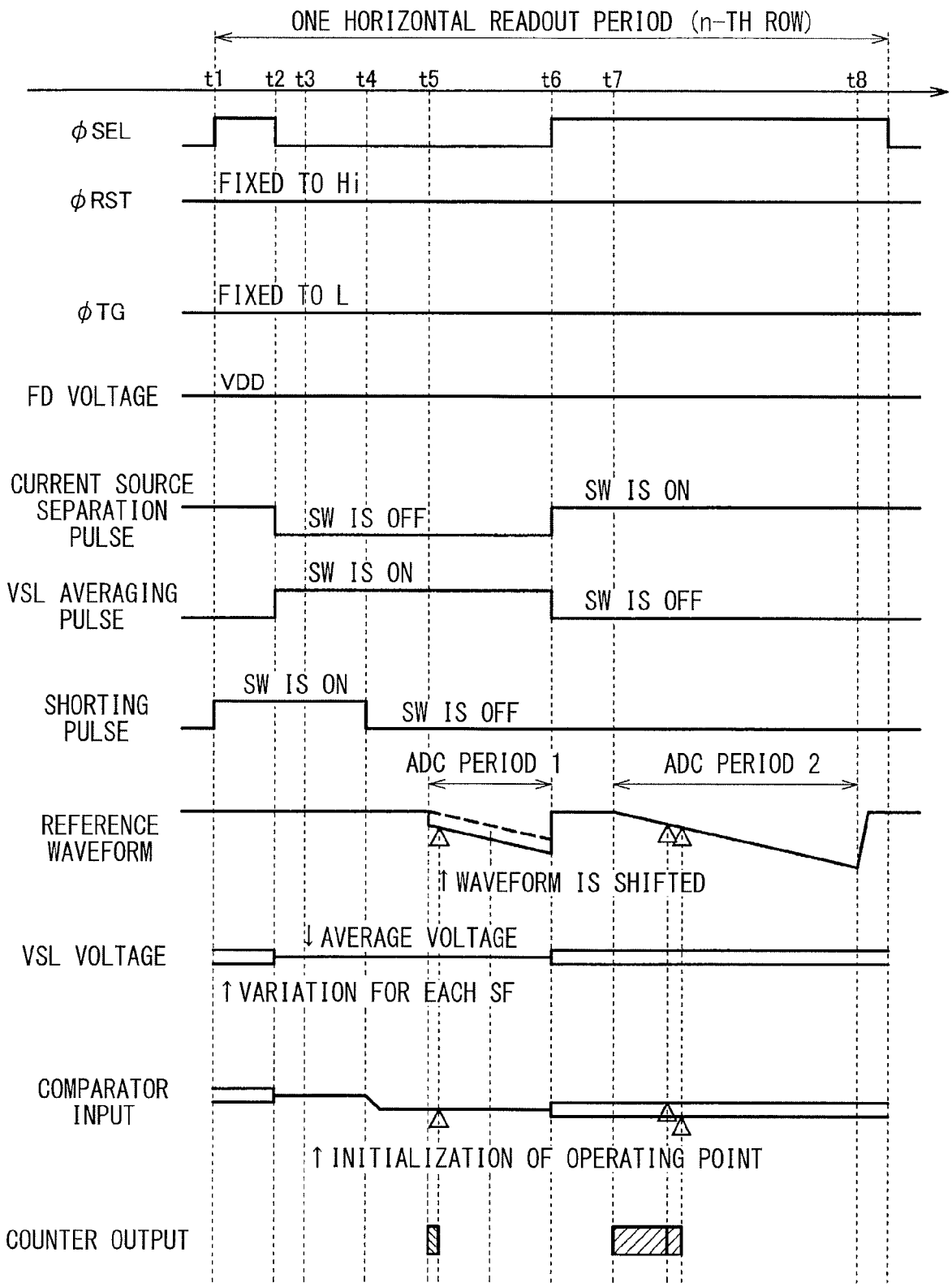

[FIG. 12]
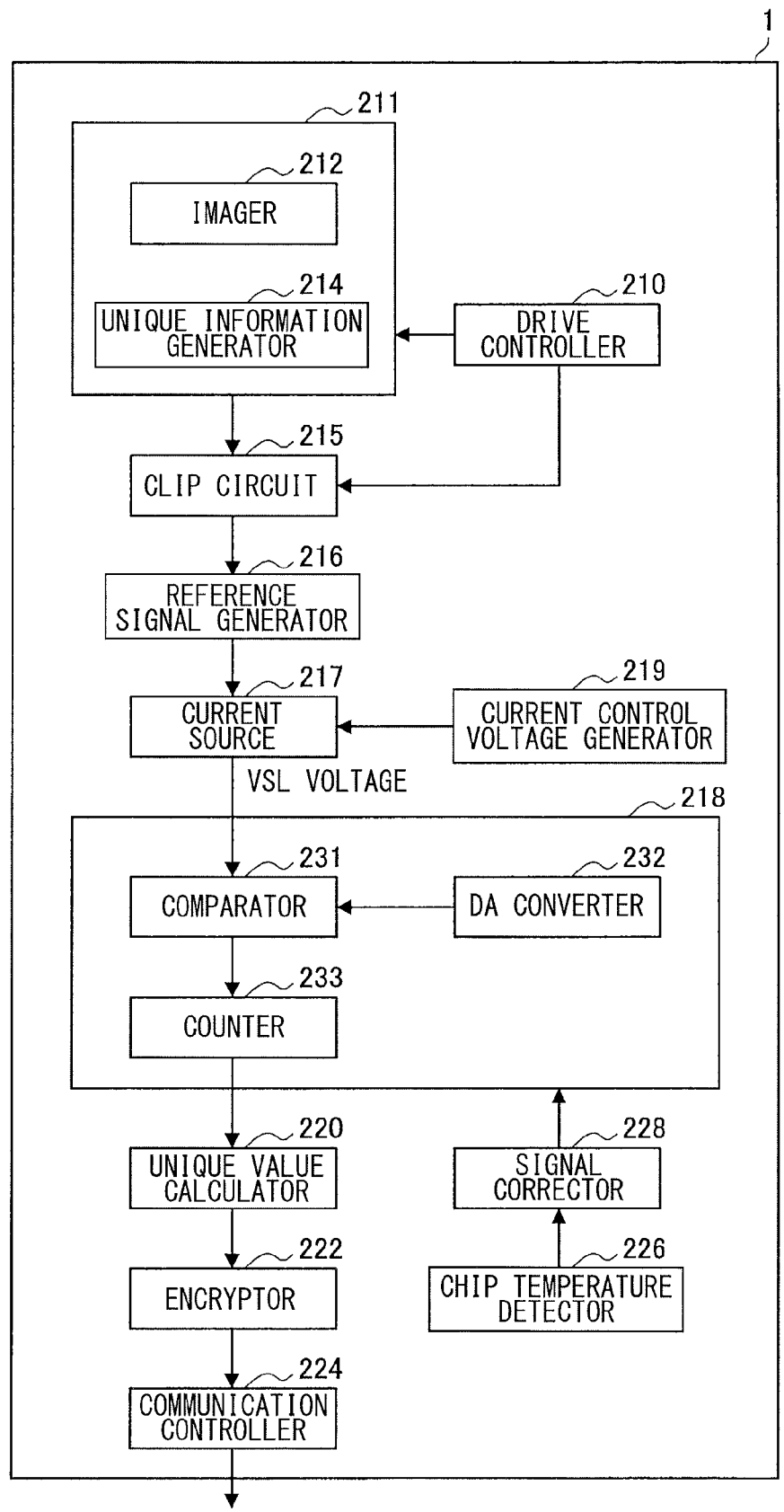

[ FIG. 13 ]
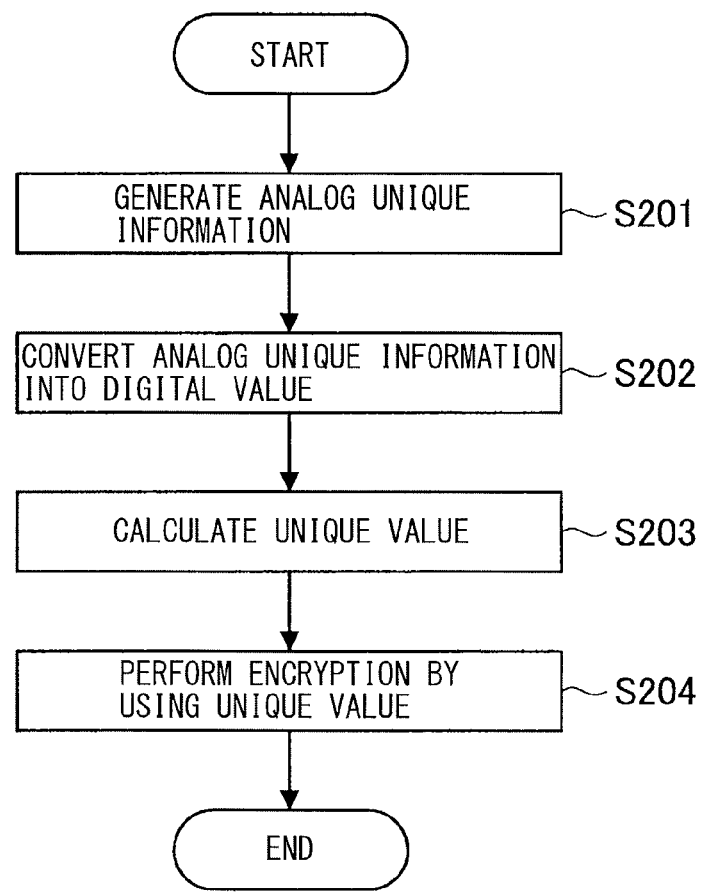

[FIG. 14]
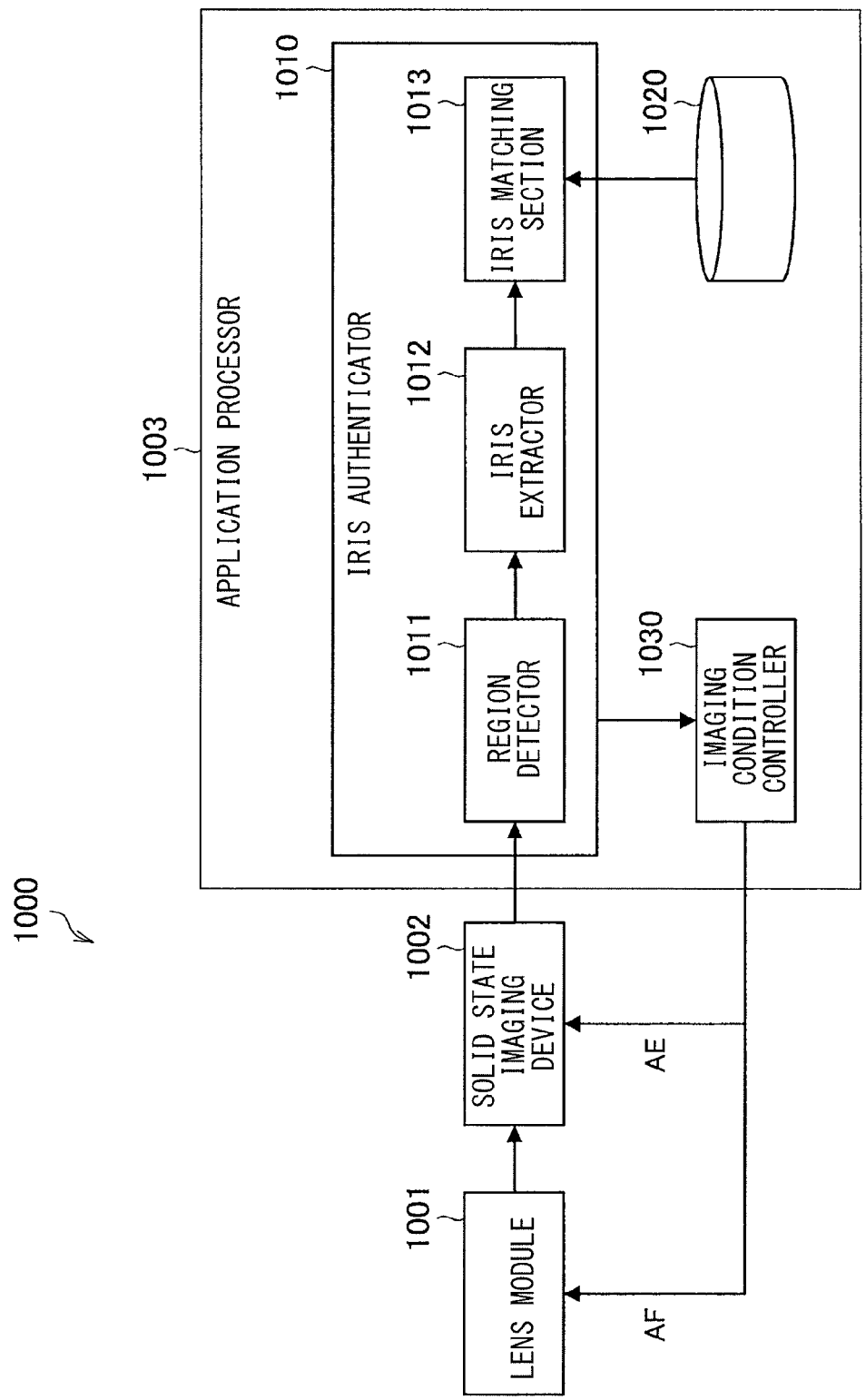

[FIG. 15]
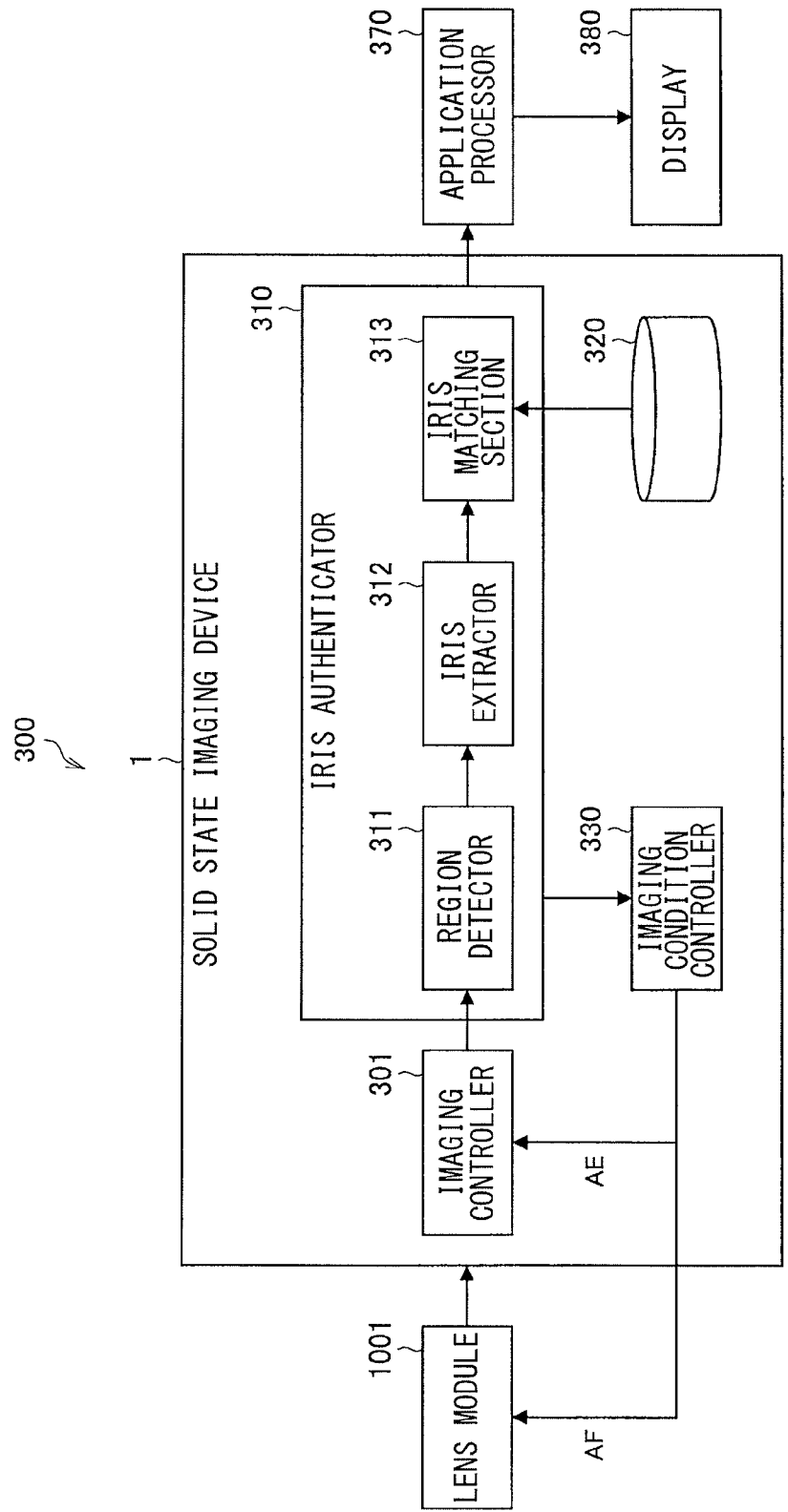

[ FIG. 16 ]
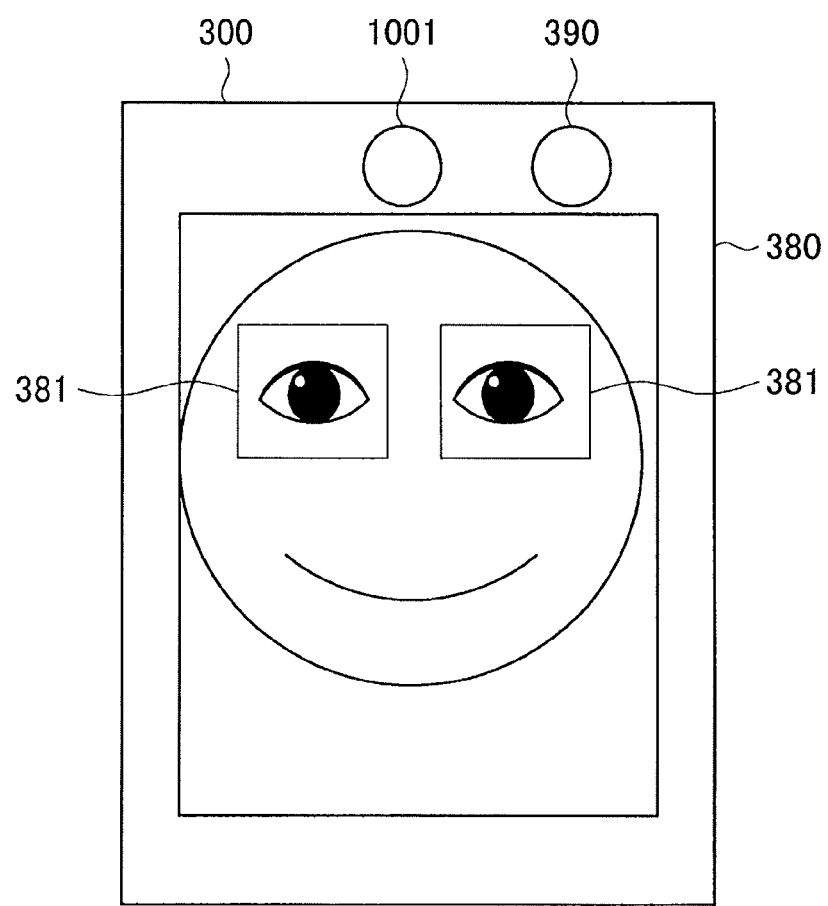

[FIG. 17]
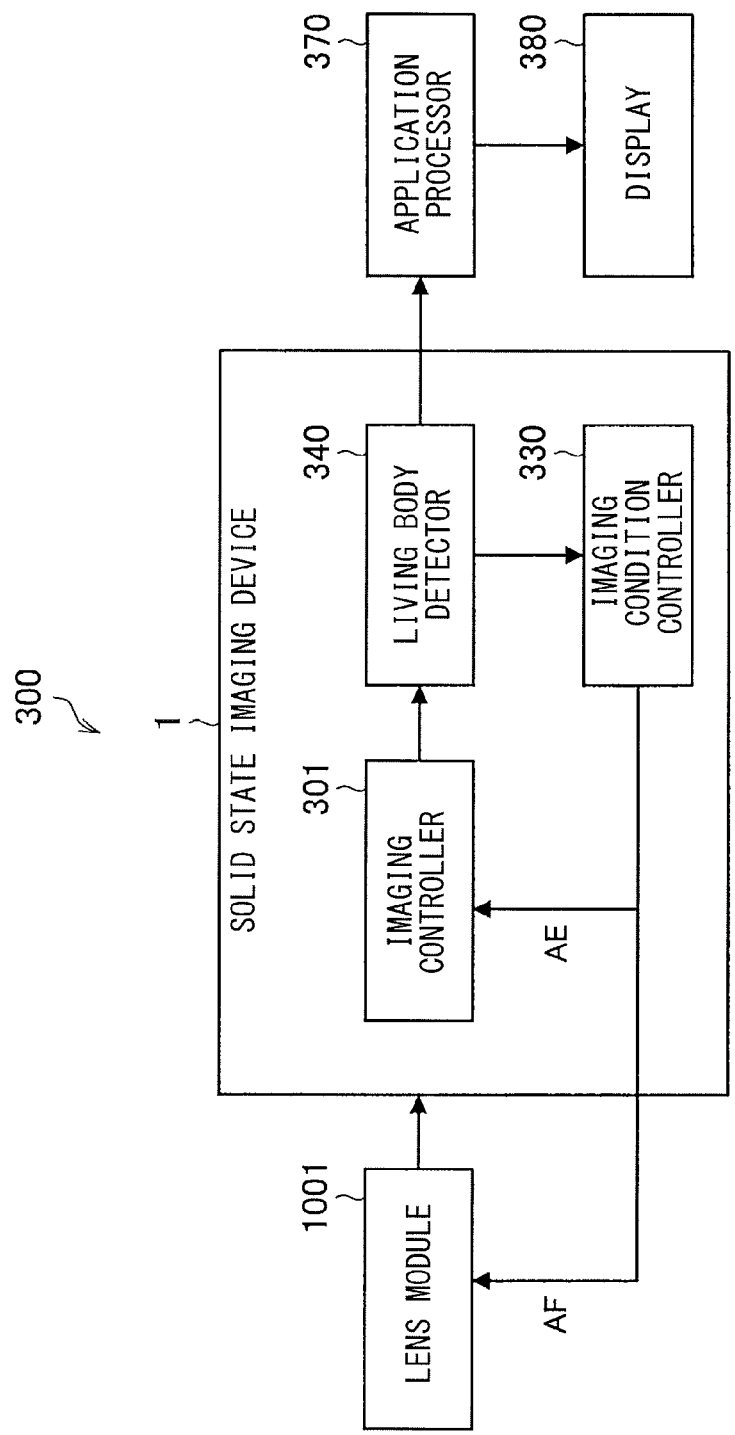

[FIG. 18]
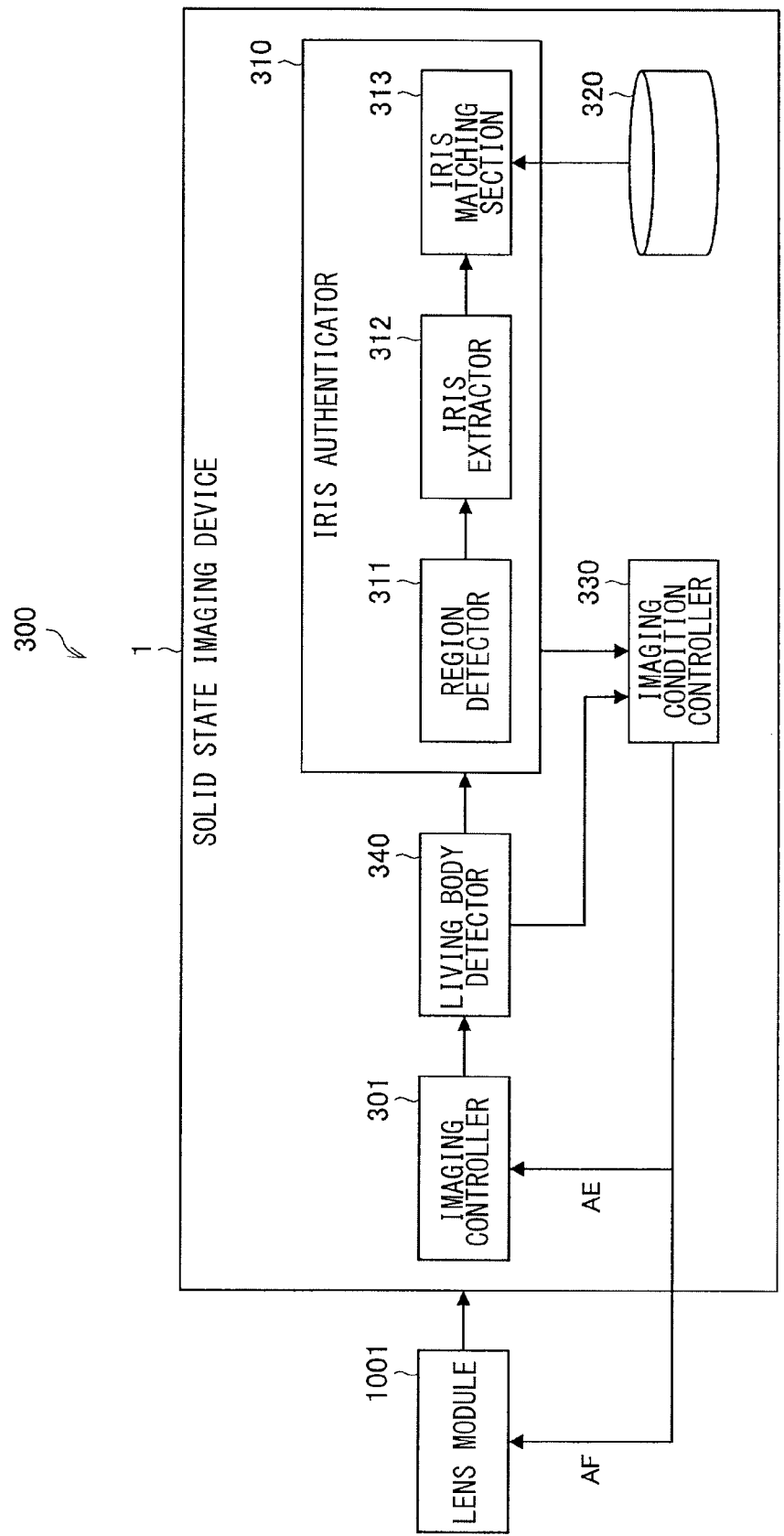

[FIG. 19]
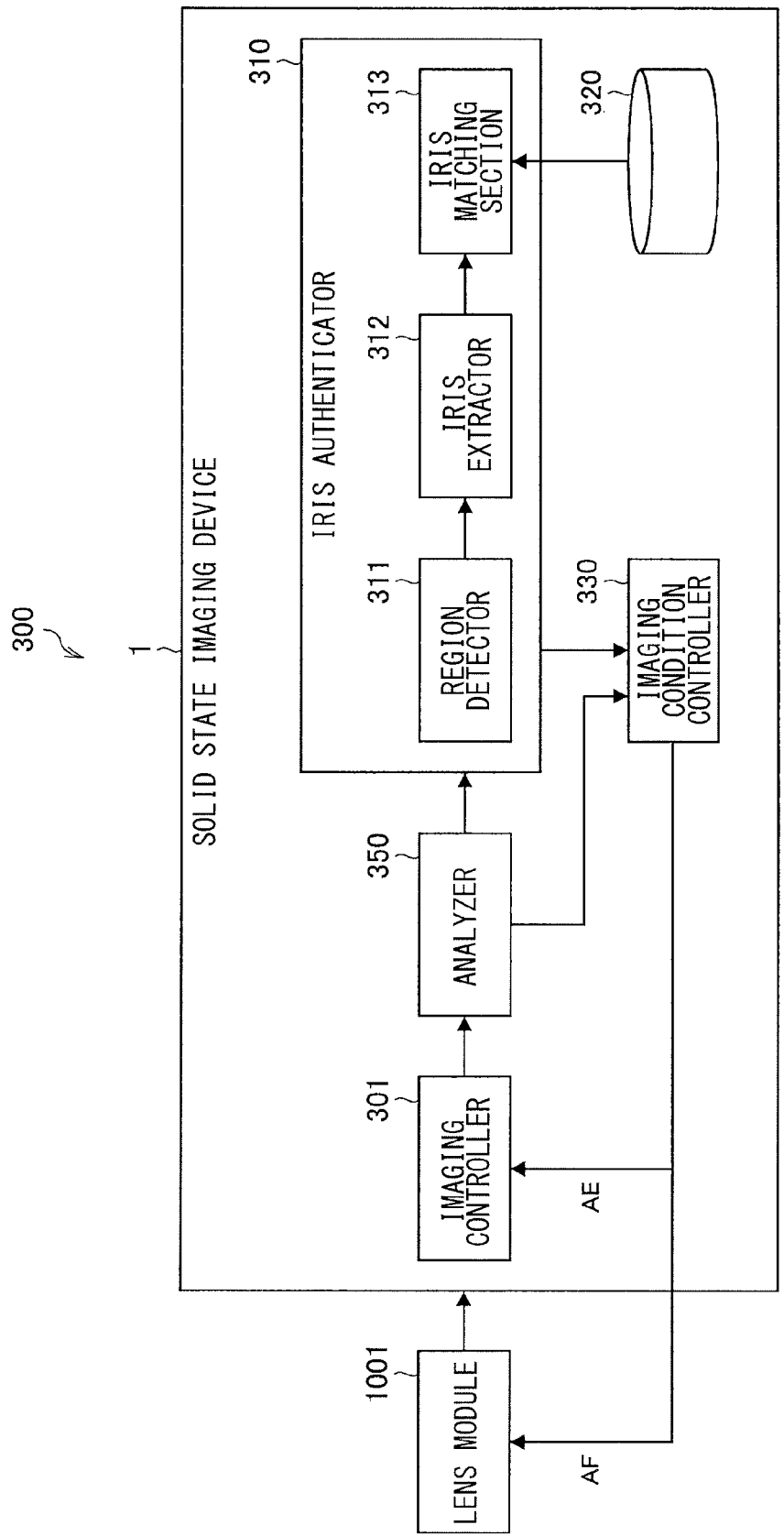

[FIG. 20]
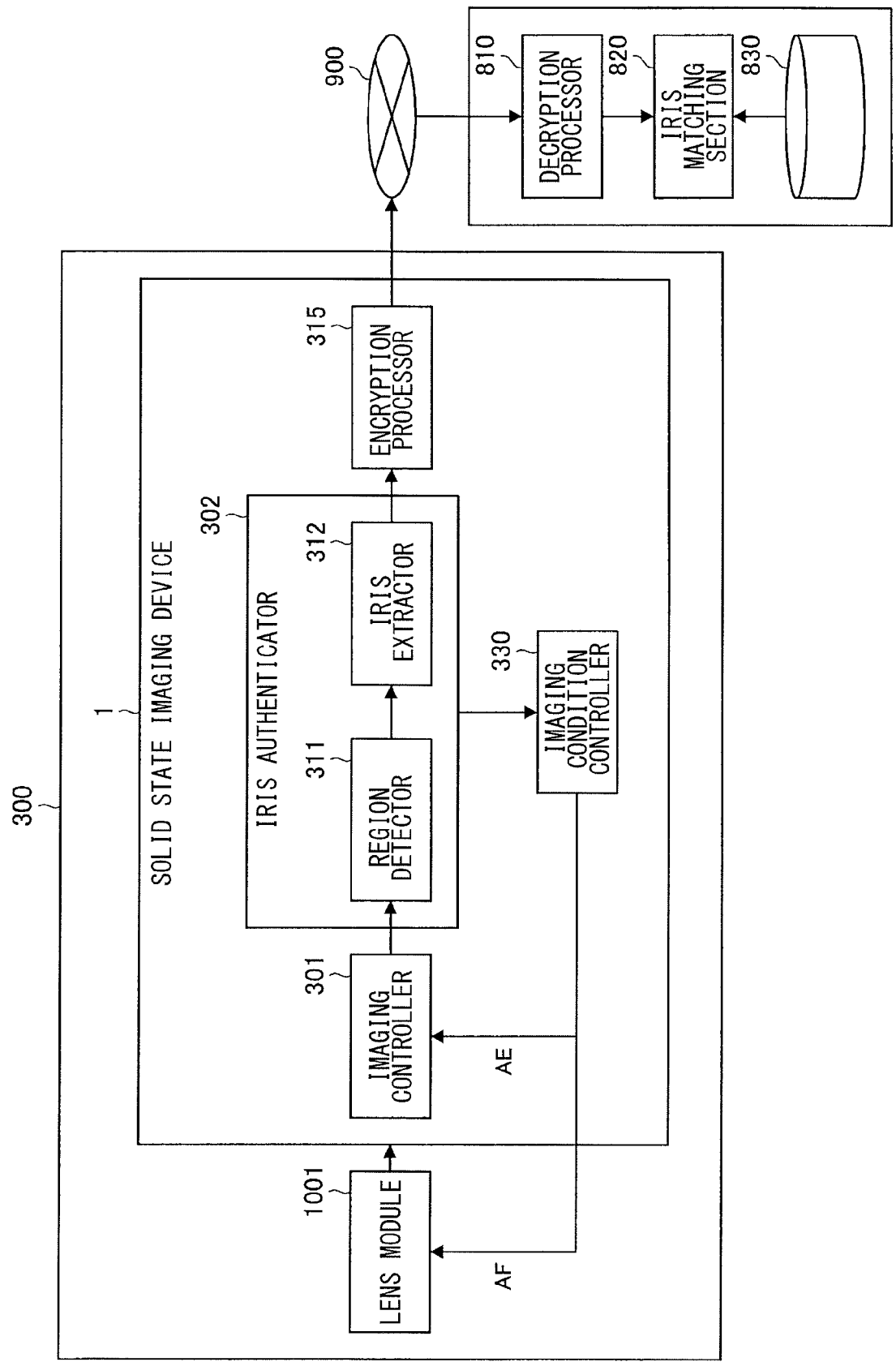

[FIG. 21]
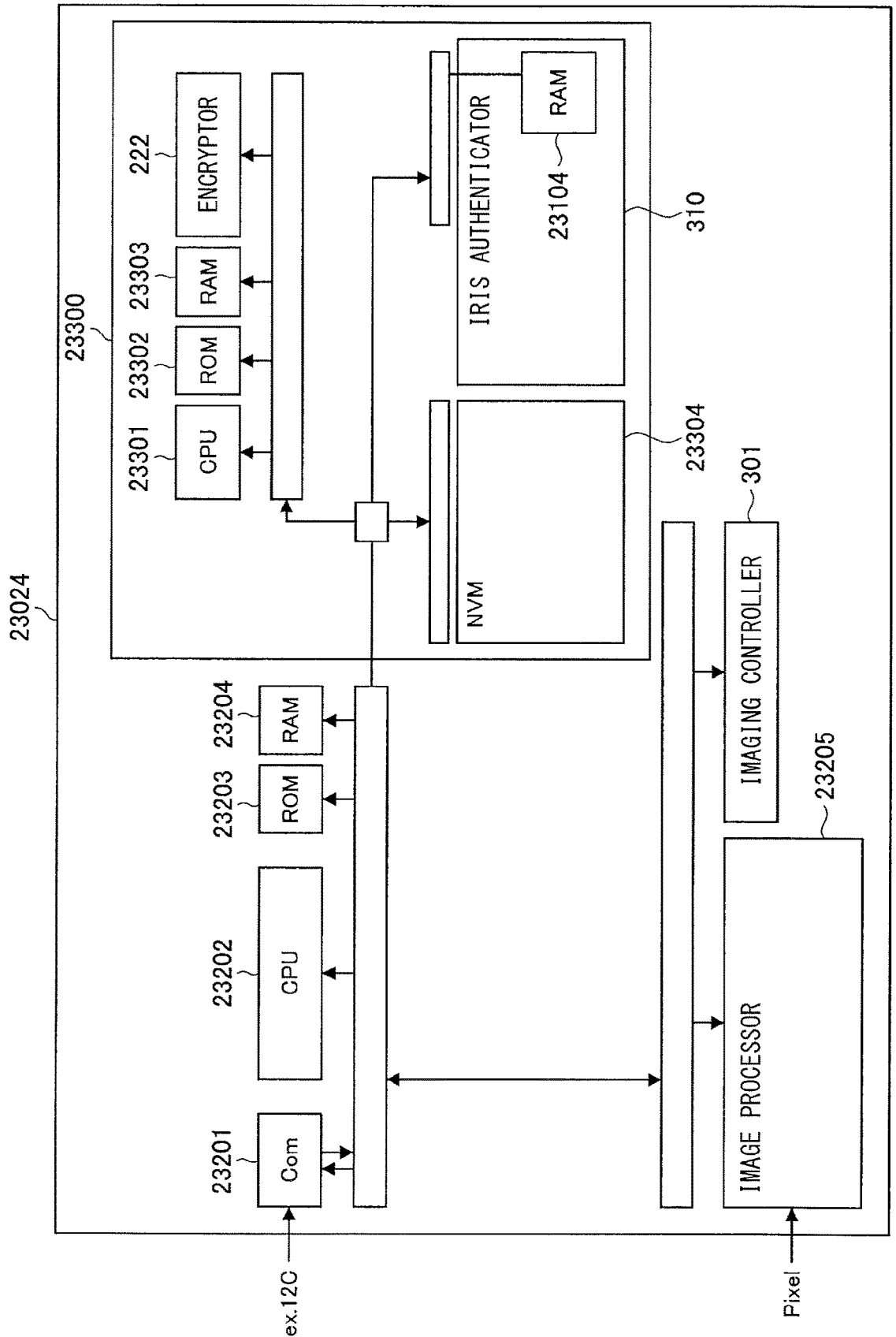

[ FIG. 22 ]
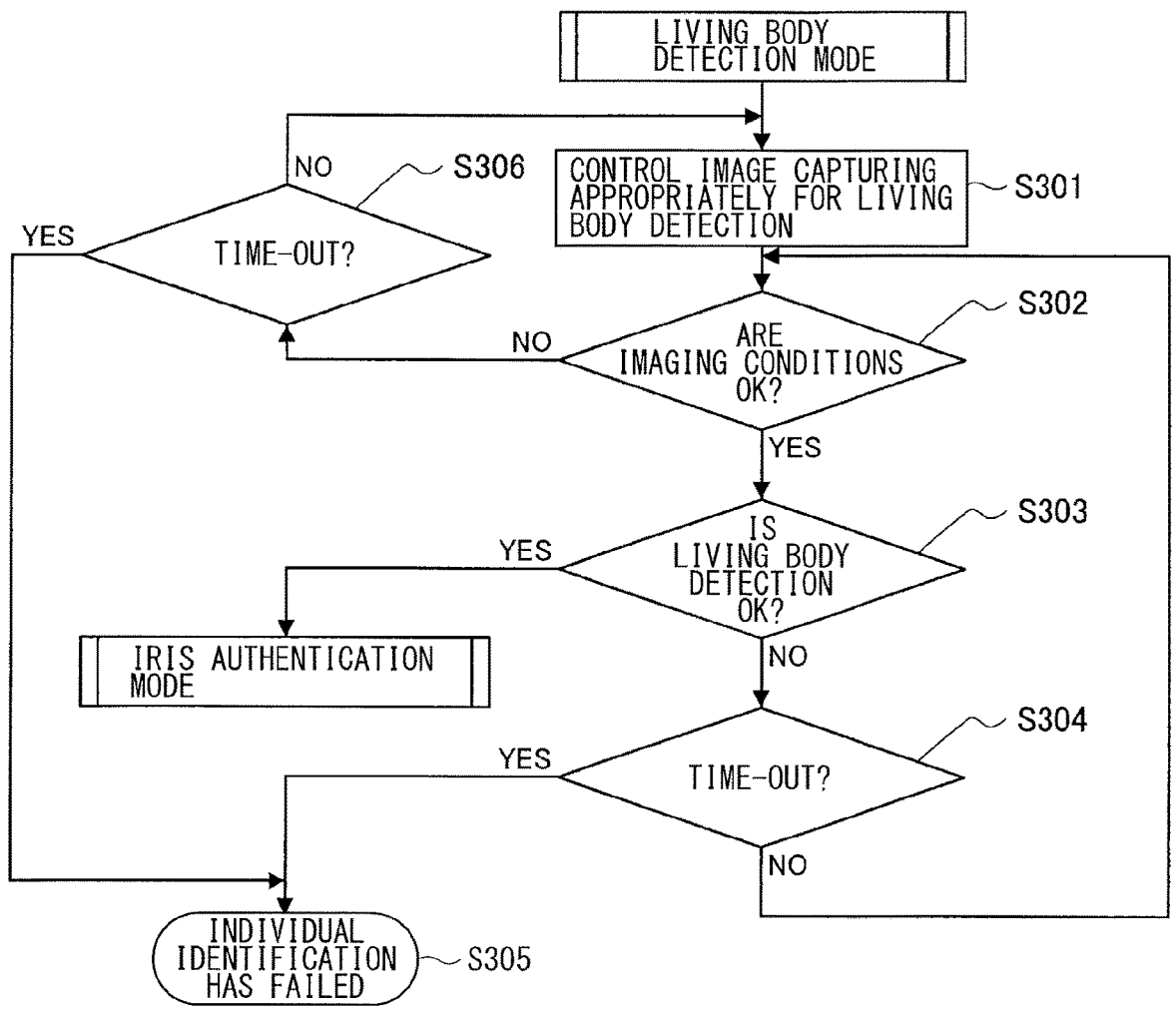

[ FIG. 23 ]
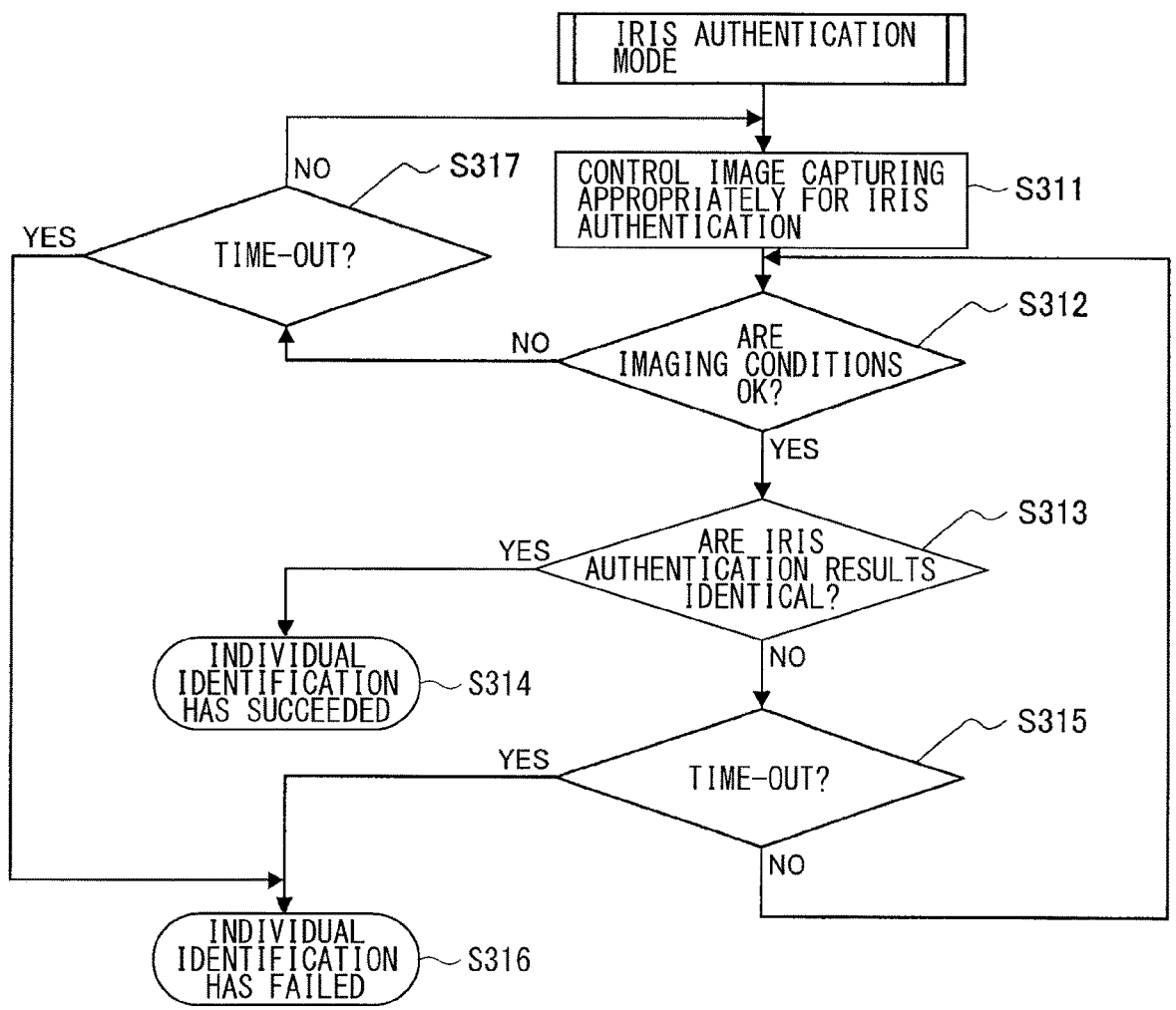

SOLID STATE IMAGING DEVICE AND METHOD OF CONTROLLING SOLID STATE IMAGING DEVICE

TECHNICAL FIELD

The present disclosure relates to solid state imaging devices and methods of controlling the solid state imaging devices.

BACKGROUND ART

Biometric authentication technologies of identifying individuals from bodily characteristics of people have been proposed. For example, the biometric authentication uses fingerprints, hand shapes, retinas, faces, voices, or the like. In addition, for example, PTL 1 proposes an iris authentication system that uses features of irises because irises of eyeballs of people are different between individuals.

CITATION LIST

Patent Literature

PTL 1: Japanese Unexamined Patent Application Publication No. 2015-170099

SUMMARY OF THE INVENTION

Problem to be Solved by the Invention

The iris authentication system captures an image of an eyeball of a person and acquires information of an iris of the eyeball from the captured image. However, to quickly perform the iris authentication, it is necessary to quickly set imaging conditions such as exposure and shutter speed that are appropriate for iris authentication.

Therefore, the present disclosure proposes novel and improved solid state imaging devices and control methods that make it possible to quickly set optimal imaging conditions for the iris authentication.

Means for Solving the Problem

According to the present disclosure, there is provided a solid state imaging device including: a pixel array in which pixels are disposed on a matrix; an iris authenticator that extracts iris information to be used in an iris authentication process, from image data obtained from the pixel array through photoelectric conversion; and an imaging condition controller that performs control to set an imaging condition in obtaining the image data for the iris authentication process, by using information obtained in a process of extracting the iris information.

In addition, according to the present disclosure, there is provided a solid state imaging device including: a first semiconductor substrate on which at least a pixel array is formed; and a second semiconductor substrate on which at least a logic circuit is formed, the second semiconductor substrate being joined to the first semiconductor substrate, the pixel array including pixels disposed on a matrix, the pixel array outputting image data, the logic circuit including an iris authenticator that extracts iris information from the image data, and an imaging condition controller that controls exposure or a focus on a basis of a result obtained by the iris authenticator.

In addition, according to the present disclosure, there is provided a method of controlling a solid state imaging device, the method including: extracting iris information to be used in an iris authentication process, from image data obtained from a pixel array through photoelectric conversion, the pixel array including pixels disposed on a matrix; and performing control to set an imaging condition in obtaining the image data for the iris authentication process, by using information obtained in a process of extracting the iris information.

Effects of the Invention

As described above, according to the present disclosure, it is possible to provide novel and improved solid state imaging devices and methods of controlling the solid state imaging devices that make it possible to quickly set optimal imaging conditions for the iris authentication.

Note that, the effects described above are not necessarily limited, and along with or instead of the effects, any effect that is described in the present specification or other effects that may be grasped from the present specification may be exhibited.

BRIEF DESCRIPTION OF DRAWINGS

FIG. 1 is a schematic configuration diagram illustrating an example of a configuration of a solid state imaging device according to an embodiment of the present disclosure.

FIG. 2 illustrates an overview of a configuration example of a multi-layer solid state imaging device to which a technology according to the present disclosure may be applied.

FIG. 3 is a cross-sectional view illustrating a first configuration example of a multi-layer solid state imaging device 23020.

FIG. 4 is a cross-sectional view illustrating a second configuration example of the multi-layer solid state imaging device 23020.

FIG. 5 is a cross-sectional view illustrating a third configuration example of the multi-layer solid state imaging device 23020.

FIG. 6 illustrates another configuration example of the multi-layer solid state imaging device to which a technology according to the present disclosure may be applied.

FIG. 7 is a block diagram illustrating an example of a functional configuration of a portion of a solid state imaging device according to an embodiment of the present disclosure.

FIG. 8 illustrates an example of a circuit configuration of a unit pixel according to an embodiment of the present disclosure.

FIG. 9 is an explanatory diagram illustrating a functional configuration example of a solid state image sensor according to a first embodiment of the present disclosure.

FIG. 10A is an explanatory diagram illustrating a circuit configuration example of a clip circuit according to the embodiment.

FIG. 10B is an explanatory diagram illustrating a circuit configuration example of a reference signal generator, a current source, and a comparator according to the embodiment.

FIG. 11 is an explanatory diagram illustrating a timing chart of operations for generating unique information according to the embodiment.

FIG. 12 is an explanatory diagram illustrating a functional configuration example of a solid state image sensor according to the embodiment.

FIG. 13 is a flowchart illustrating an operation example of the solid state image sensor according to the embodiment.

FIG. 14 is an explanatory diagram illustrating a comparative example of the embodiment.

FIG. 15 is an explanatory diagram illustrating a configuration example of an information processing apparatus including the solid state imaging device according to the embodiment.

FIG. 16 is an explanatory diagram illustrating an example of a screen displayed on a display of the information processing apparatus.

FIG. 17 is an explanatory diagram illustrating a configuration example of an information processing apparatus including a solid state imaging device according to the embodiment.

FIG. 18 is an explanatory diagram illustrating a configuration example of an information processing apparatus according to the embodiment.

FIG. 19 is an explanatory diagram illustrating a configuration example of an information processing apparatus including a solid state imaging device according to the embodiment.

FIG. 20 is an explanatory diagram illustrating a configuration example of an iris authentication system.

FIG. 21 is an explanatory diagram illustrating a configuration example of a circuit formed in a logic die included in a solid state imaging device according to the embodiment.

FIG. 22 is a flowchart illustrating an operation example of a solid state imaging device according to the embodiment.

FIG. 23 is a flowchart illustrating an operation example of a solid state imaging device according to the embodiment.

MODES FOR CARRYING OUT THE INVENTION

Hereinafter, preferred embodiments of the present disclosure will be described in detail with reference to the appended drawings. Note that, in this specification and the drawings, structural elements that have substantially the same function and configuration are denoted with the same reference signs, and repeated explanation is omitted.

Note that, the description will be given in the following order.
1. Configuration Example of Solid State Imaging Device
1.1. Schematic Configuration
1.2. Functional Configuration
1.3. Circuit Configuration of Unit Pixel
1.4. Encryption Process
1.4.1. Configuration Example
1.4.2. Operation Example
1.5. Biometric Authentication Process
1.5.1. Comparative Example
1.5.2. Configuration Example
1.5.3. Operation Example
1.5.4. Application Example
2. Conclusion

1. Configuration Example of Solid State Imaging Device

A configuration example of a solid state imaging device according to the present embodiment will be described below.

1.1. Schematic Configuration

FIG. 1 illustrates a schematic configuration of a CMOS solid state imaging device as an example of a configuration of a solid state imaging device according to an embodiment of the present disclosure. The CMOS solid state imaging device is applied to solid state imaging devices of each embodiment. As illustrated in FIG. 1, a solid state imaging device 1 of this example includes a pixel array (so-called pixel region) 3 in which pixels 2 including a plurality of photoelectric conversion sections are regularly disposed in a two-dimensional array form on a semiconductor substrate 11, for example, a silicon substrate, and a peripheral circuit section. The pixel 2 includes, for example, a photodiode serving as the photoelectric conversion section and a plurality of pixel transistors (so-called MOS transistors). The plurality of pixel transistors is able to include three transistors, for example, a transfer transistor, a reset transistor, and an amplification transistor. In addition, it is possible for the plurality of pixel transistors to include four transistors by adding a selection transistor thereto. Note that, an example of an equivalent circuit of a unit pixel will be described later. It is possible for the pixel 2 to be configured as one unit pixel. In addition, the pixel 2 is also able to have a shared pixel structure. The shared pixel structure is constituted by a plurality of photodiodes, a plurality of transfer transistors, one shared floating diffusion, and each one of other shared pixel transistors. In other words, in the shared pixel, the photodiodes and the transfer transistors constituting a plurality of unit pixels are configured to share each one of other pixel transistors.

The peripheral circuit section includes a vertical driving circuit 4, column signal processing circuits 5, a horizontal driving circuit 6, an output circuit 7, a control circuit 8, and the like.

The control circuit 8 receives input clocks and data for instructing on an operation mode and the like, and outputs data of internal information of the solid state imaging device and the like. In other words, the control circuit 8 generates clock signals and control signals which serve as a reference of operations of the vertical driving circuit 4, the column signal processing circuit 5, the horizontal driving circuit 6, and the like, on the basis of vertical synchronization signals, horizontal synchronization signals, and master clocks. In addition, the control circuit 8 inputs these signals to the vertical driving circuit 4, the column signal processing circuit 5, the horizontal driving circuit 6, and the like.

The vertical driving circuit 4 includes, for example, a shift register, selects a pixel driving wiring line, supplies a pulse for driving a pixel to the selected pixel driving wiring line, and drives pixels in units of rows. In other words, the vertical driving circuit 4 sequentially selects and scans each pixel 2 of the pixel array 3 in units of rows in a vertical direction, and supplies a pixel signal based on signal electric charges generated according to the amount of received light in, for example, the photodiode serving as the photoelectric conversion section of each pixel 2 to the column signal processing circuit 5 through a vertical signal line 9.

The column signal processing circuit 5 is disposed for, for example, each column of the pixels 2, and performs a signal process such as removing noise of signals output from pixels 2 in one row for each pixel column. In other words, the column signal processing circuit 5 performs a signal process such as a CDS for removing fixed pattern noise specific to the pixel 2, signal amplification, AD conversion, or the like. In the output stage of the column signal processing circuit 5, a horizontal selection switch (not illustrated in the drawings) is provided by being coupled to a horizontal signal line 10.

The horizontal driving circuit 6 includes, for example a shift register, sequentially selects each of the column signal processing circuits 5 by sequentially outputting horizontal scanning pulses, and causes pixel signals to be outputted from each of the column signal processing circuits 5 to the horizontal signal line 10.

The output circuit 7 performs a signal process on the signal sequentially supplied from each of the column signal processing circuits 5 through the horizontal signal line 10, and outputs the processed signals. For example, sometimes only buffering is performed, or sometimes adjustment of black level, correction of column variation, various digital signal processing, or the like is performed. An input/output terminal 12 exchanges signals with an outside.

In addition, FIG. 2 illustrates an overview of a configuration example of a multi-layer solid state imaging device to which a technology according to the present disclosure may be applied.

A of FIG. 2 illustrates a schematic configuration example of a single-layer solid state imaging device. As illustrated in A of FIG. 2, a solid state imaging device 23010 includes a single die (semiconductor substrate) 23011. Mounted on the die 23011 are a pixel region 23012, a control circuit 23013, and a logic circuit 23014. In the pixel region 23012, pixels are disposed in an array form. The control circuit 23013 performs various kinds of control including control of driving the pixels. The logic circuit 23014 performs a signal process.

B and C of FIG. 2 illustrate schematic configuration examples of multi-layer solid state imaging devices. As illustrated in B and C of FIG. 2, two dies, namely a sensor die 23021 and a logic die 23024, are stacked in a solid state imaging device 23020. These dies are electrically coupled to form a single semiconductor chip.

With reference to B of FIG. 2, the pixel region 23012 and the control circuit 23013 are mounted on the sensor die 23021, and the logic circuit 23014 is mounted on the logic die 23024. The logic circuit 23014 includes a signal processing circuit that processes signals.

With reference to C of FIG. 2, the pixel region 23012 is mounted on the sensor die 23021, and the control circuit 23013 and the logic circuit 23014 are mounted on the logic die 23024.

FIG. 3 is a cross-sectional view illustrating a first configuration example of the multi-layer solid state imaging device 23020.

A photodiode (PD), a floating diffusion (FD), and a Tr (MOS FET) that constitute a pixel serving as the pixel region 23012, and a Tr or the like serving as the control circuit 23013 are formed in the sensor die 23021. In addition, a wiring layer 23101 including a plurality of layers, that is, in this example, three layers of wiring lines 23110 is formed in the sensor die 23021. Note that, it is possible to form (the Tr serving as) the control circuit 23013 not in the sensor die 23021 but in the logic die 23024.

A Tr constituting the logic circuit 23014 is formed in the logic die 23024. In addition, a wiring layer 23161 including a plurality of layers, that is, in this example, three layers of wiring lines 23170 is formed in the logic die 23024. In addition, a contact hole 23171 is formed in the logic die 23024. An insulating film 23172 is formed on an inner wall of the contact hole 23171. A connection conductor 23173 to be coupled to the wiring line 23170 and the like is embedded in the contact hole 23171.

The sensor die 23021 and the logic die 23024 are bonded in a manner that the wiring layer 23101 of the sensor die 23021 and the wiring layer 23161 of the logic die 23024 face each other. This makes it possible to form the multi-layer solid state imaging device 23020 in which the sensor die 23021 and the logic die 23024 are stacked. A film 23191 such as a protective film is formed on a surface through which the sensor die 23021 and the logic die 23024 are bonded.

A contact hole 23111 is formed in the sensor die 23021. The contact hole 23111 penetrates the sensor die 23021 from a back surface side (a side from which light is incident on the PD) (an upper side) of the sensor die 23021 and reaches the wiring line 23170 of an uppermost layer of the logic die 23024. In addition, a contact hole 23121 is formed in the vicinity of the contact hole 23111 in the sensor die 23021. The contact hole 23121 reaches the wiring line 23110 of a first layer from the back surface side of the sensor die 23021. An insulating film 23112 is formed on an inner wall of the contact hole 23111, and an insulating film 23122 is formed on an inner wall of the contact hole 23121. In addition, connection conductors 23113 and 23123 are respectively embedded in the contact holes 23111 and 23121. The connection conductor 23113 and the connection conductor 23123 are electrically coupled to each other on the back surface side of the sensor die 23021. This makes it possible to electrically couple the sensor die 23021 and the logic die 23024 via the wiring layer 23101, the contact hole 23121, the contact hole 23111, and the wiring layer 23161.

FIG. 4 is a cross-sectional view illustrating a second configuration example of the multi-layer solid state imaging device 23020.

According to the second configuration example of the solid state imaging device 23020, ((the wiring line 23110) of the wiring layer 23101 of) the sensor die 23021 and ((the wiring line 23170) of the wiring layer 23161 of) the logic die 23024 are electrically coupled via one contact hole 23211 formed in the sensor die 23021.

In other words, with reference to FIG. 4, the contact hole 23211 is formed to penetrate the sensor die 23021 from the back surface side of the sensor die 23021 to reach the wiring line 23170 of the uppermost layer of the logic die 23024 and reach the wiring line 23110 of the uppermost layer of the sensor die 23021. An insulating film 23212 is formed on an inner wall of the contact hole 23211, and a connection conductor 23213 is embedded in the contact hole 23211. With reference to FIG. 3 described above, the sensor die 23021 and the logic die 23024 are electrically coupled via the two contact holes 23111 and 23121. However, with reference to FIG. 4, the sensor die 23021 and the logic die 23024 are electrically coupled via the one contact hole 23211.

FIG. 5 is a cross-sectional view illustrating a third configuration example of the multi-layer solid state imaging device 23020.

The solid state imaging device 23020 illustrated in FIG. 5 in which the film 23191 such as the protective film is not formed on a surface through which the sensor die 23021 and the logic die 23024 are bonded is different from the solid state imaging device 23020 illustrated in FIG. 3 in which the film 23191 such as the protective film is formed on the surface through which the sensor die 23021 and the logic die 23024 are bonded.

The solid state imaging device 23020 illustrated in FIG. 5 is configured by stacking the sensor die 23021 and the logic die 23024 together in a manner that the wiring line 23110 and the wiring line 23170 directly contact each other, heating them while subjecting them to necessary weight bearing, and directly joining the wiring line 23110 and the wiring line 23170.

FIG. 6 is a cross-sectional view illustrating another configuration example of the multi-layer solid state imaging device to which a technology according to the present disclosure may be applied.

With reference to FIG. 6, a solid state imaging device 23401 has a three-layer stacked structure in which three dies are stacked. The three dies are a sensor die 23411, a logic die 23412, and a memory die 23413.

For example, the memory die 23413 includes a memory circuit that stores data which is temporarily necessary for a signal process performed by the logic die 23412.

With reference to FIG. 6, the logic die 23412 and the memory die 23413 are stacked in this order under the sensor die 23411. However, the logic die 23412 and the memory die 23413 may be stacked in the opposite order. In other words, the memory die 23413 and the logic die 23412 may be stacked in this order under the sensor die 23411.

Note that, with reference to FIG. 6, a PD serving as the photoelectric conversion section of a pixel and source/drain regions of the pixel transistors Tr are formed in the sensor die 23411.

A gate electrode is formed via a gate insulating film around the PD, and a pixel Tr 23421 and a pixel Tr 23422 are formed by the gate electrode and the pair of source/drain regions.

The pixel Tr 23421 adjacent to the PD is a transfer Tr, and one of the pair of source/drain regions constituting the pixel Tr 23421 is FD.

In addition, an interlayer insulating film is formed in the sensor die 23411, and contact holes are formed in the interlayer insulating film. In the contact holes, connection conductors 23431 are formed. The connection conductors 23431 are coupled to the pixel Tr 23421 and the pixel Tr 23422.

In addition, a wiring layer 23433 including a plurality of layers of wiring lines 23432 to be coupled to the connection conductors 23431 is formed in the sensor die 23411.

In addition, an aluminum pad 23434 serving as an electrode for external coupling is formed in a lowermost layer of the wiring layer 23433 in the sensor die 23411. In other words, in the sensor die 23411, the aluminum pad 23434 is formed at a position closer to a bonding surface 23440 with the logic die 23412 than the wiring line 23432 is. The aluminum pad 23434 is used as one end of a wiring line related to input and output of signals to/from an outside.

In addition, a contact 23441 is formed in the sensor die 23411. The contact 23441 is used for electrical coupling to the logic die 23412. The contact 23441 is coupled to a contact 23451 of the logic die 23412, and is also coupled to an aluminum pad 23442 of the sensor die 23411.

In addition, a pad hole 23443 is formed in the sensor die 23411. The pad hole 23443 reaches the aluminum pad 23442 from the back surface side (the upper side) of the sensor die 23411.

The technology according to the present disclosure is applicable to the above-described solid state imaging devices.

Note that, in the examples described with reference to FIG. 3 to FIG. 6, for example, copper (Cu) wiring lines are used as the various kinds of wiring lines. In addition, hereinafter, as illustrated in FIG. 5, a configuration of directly joining the wiring lines (for example, the wiring line 23110 and the wiring line 23170 illustrated in FIG. 5) of the sensor dies stacked on each other is also referred to as "Cu—Cu bonding".

1.2. Functional Configuration

Next, with reference to FIG. 7, an example of a functional configuration of the solid state imaging device according to the embodiment of the present disclosure will be described. FIG. 7 is a block diagram illustrating an example of a functional configuration of a portion of the solid state imaging device according to the embodiment of the present disclosure. The solid state imaging device 1 in FIG. 7 is an image sensor such as, for example, a complementary metal oxide semiconductor (CMOS) image sensor and a charge coupled device (CCD) image sensor, which captures an image of a subject and obtains digital data of the captured image.

As illustrated in FIG. 7, the solid state imaging device 1 includes a controller 101, a pixel array section 111, a selector 112, an A/D converter (ADC (analog digital converter)) 113, and a constant current circuit section 114.

The controller 101 controls each structural element of the solid state imaging device 1 and causes the structural element to perform a process related to readout of image data (pixel signal) and the like.

The pixel array section 111 is a pixel region in which pixel structures including photoelectric conversion elements such as photodiodes are disposed in a matrix (array) form. The pixel array section 111 is controlled by the controller 101, receives light of a subject at each pixel, performs photoelectric conversion of the incident light to accumulate electric charges, and outputs the electric charges accumulated in each pixel as a pixel signal at a predetermined timing.

A pixel 121 and a pixel 122 represent two pixels adjacent to each other in an up-down direction in a pixel group disposed in the pixel array section 111. The pixel 121 and the pixel 122 are pixels in successive rows in a same column. In a case of the example in FIG. 7, as represented by the pixel 121 and the pixel 122, a photoelectric conversion element and four transistors are used in a circuit of each pixel. Note that, the configuration of the circuit of each pixel is optional, and it is possible to use a configuration other than the example illustrated in FIG. 7.

In a general pixel array, an output line of the pixel signal is provided for each column. In a case of the pixel array section 111, two (two-path) output lines are provided for each column. The circuits of pixels in one column are alternately coupled to the two output lines every other row. For example, a circuit of a pixel in an odd-numbered row from the top is coupled to one output line and a circuit of a pixel in an even-numbered row is coupled to the other output line. In the case of the example in FIG. 7, the circuit of the pixel 121 is coupled to a first output line (VSL1) and the circuit of the pixel 122 is coupled to a second output line (VSL2).

Note that, in FIG. 7, for convenience of description, only the output lines for one column are illustrated. However, in practice, two output lines are provided to each column in a similar manner. The circuits of the pixels in the column are coupled to each output line every other row.

The selector 112 includes switches that couples each output line of the pixel array section 111 to inputs of the ADC 113. The selector 112 is controlled by the controller 101 and controls coupling between the pixel array section 111 and the ADC 113. In other words, the pixel signals read from the pixel array section 111 are supplied to the ADC 113 through the selector 112.

The selector 112 includes a switch 131, a switch 132, and a switch 133. The switch 131 (selection SW) controls coupling of two output lines corresponding to a same column. For example, when the switch 131 becomes ON state, the first output line (VSL1) and the second output line (VSL2) are coupled. When the switch 131 becomes OFF state, the first output line (VSL1) and the second output line (VSL2) are decoupled.

Although the details are described later, in the solid state imaging device 1, one ADC (column ADC) is provided to each output line. Therefore, if both the switches 132 and 133 are in ON state, when the switch 131 becomes ON state, two output lines of the same column are coupled, and the circuit of one pixel is coupled to two ADCs. On the other hand, when the switch 131 becomes OFF state, two output lines of the same column are decoupled, and the circuit of one pixel is coupled to one ADC. In other words, the switch 131 selects the number of ADCs (column ADCs) to which a signal of one pixel is to be outputted.

Although details are described later, the switch 131 thus controls the number of ADCs to which the pixel signal is to be outputted, which enables the solid state imaging device 1 to output more various pixel signals in accordance with the number of ADCs. In other words, the solid state imaging device 1 is able to implement more various data outputs.

The switch 132 controls coupling between the first output line (VSL1) corresponding to the pixel 121 and the ADC corresponding to the output line. When the switch 132 becomes ON state, the first output line is coupled to one input of a comparator of the corresponding ADC. When the switch 132 becomes OFF state, these are decoupled.

The switch 133 controls coupling between the second output line (VSL2) corresponding to the pixel 122 and the ADC corresponding to the output line. When the switch 133 becomes ON state, the second output line is coupled to one input of a comparator of the corresponding ADC. When the switch 133 becomes OFF state, these are decoupled.

The selector 112 is able to control the number of ADCs (column ADCs) to which the signal of one pixel is to be outputted, by switching the states of the switch 131 to the switch 133 under the control of the controller 101.

Note that, it is possible to omit the switch 132 and/or the switch 133 (either one or both of them) and couple each output line and the ADC corresponding to the output line at all times. Note that, enabling these coupling/decoupling to be controlled by these switches makes it possible to have a wide selection range of the number of ADCs (column ADCs) to which the signal of one pixel is to be outputted. In other words, it is possible for the solid state imaging device 1 to output more various pixel signals by installing these switches.

Note that, in FIG. 7, only the structural elements corresponding to the output lines for one column are illustrated. However, in practice, the selector 112 has a similar configuration to that illustrated in FIG. 7 (switches 131 to 133) for each column. In other words, the selector 112 performs similar coupling control to that described above under the control of the controller 101 for each column.

The ADC 113 performs A/D-conversion of the pixel signals supplied from the pixel array section 111 via the respective output lines and outputs the pixel signals as digital data. The ADC 113 includes the ADC (column ADC) for each output line from the pixel array section 111. In other words, the ADC 113 includes a plurality of column ADCs.

The column ADC corresponding to one output line is a single-slope ADC including a comparator, a D/A converter (DAC), and a counter.

The comparator compares its DAC output and a signal value of the pixel signal. The counter increments a count value (digital value) until the pixel signal and the DAC output become equal. The comparator stops the counter when the DAC output reaches the signal value. Thereafter, signals digitalized by counters 1 and 2 are outputted to the outside of the solid state imaging device 1 from DATA1 and DATA2.

The counters return the count value to an initial value (for example, 0) after outputting data for next A/D conversion.

The ADC 113 includes two-path column ADCs for each column. For example, a comparator 141 (COMP1), a DAC 142 (DAC1), and a counter 143 (counter 1) are provided for the first output line (VSL1), and a comparator 151 (COMP2), a DAC 152 (DAC2), and a counter 153 (counter 2) are provided for the second output line (VSL2). Although not illustrated in the drawings, the ADC 113 has a similar configuration for the output lines of the other columns.

However, of these structural elements, it is possible to share the DAC. The DAC is shared for each path. In other words, the DAC of the same path of each column is shared. In the case of the example in FIG. 7, the DAC corresponding to the first output line (VSL1) of each column is shared as the DAC 142 and the DAC corresponding to the second output line (VSL2) of each column is shared as the DAC 152. Note that, the comparator and the counter are provided for each path of output lines.

The constant current circuit section 114 is a constant current circuit coupled to each output line and driven under the control of the controller 101. The circuit of the constant current circuit section 114 includes, for example, a metal oxide semiconductor (MOS) transistor or the like. Although the configuration of the circuit is optional, in FIG. 7, for convenience of description, a MOS transistor 161 (LOAD1) is provided for the first output line (VSL1) and a MOS transistor 162 (LOAD2) is provided for the second output line (VSL2).

The controller 101 selects a readout mode by receiving a request from an outside such as, for example, a user, controls the selector 112, and controls coupling of the output lines. Further, the controller 101 controls drive of the column ADCs in accordance with the selected readout mode. Further, the controller 101 controls drive of the constant current circuit section 114 and controls drive of the pixel array section 111 such as, for example, a rate and timing of the readout, as needed in addition to the drive of the column ADCs.

In other words, the controller 101 is able to not only control the selector 112 but also cause respective structural elements other than the selector 112 to operate in more various modes. Therefore, the solid state imaging device 1 is able to output more various pixel signals.

Note that, the number of structural elements illustrated in FIG. 7 is optional unless it is insufficient. For example, three or more paths of output lines may be provided for each column. In addition, it is possible to increase the number of pixel signals outputted in parallel to the outside by increasing the number of pixel signals outputted in parallel from the ADC 132 or the number of ADCs 132 themselves in FIG. 7.

With reference to FIG. 7, the example of the functional configuration of the solid state imaging device according to the embodiment of the present disclosure has been described above.

1.3. Circuit Configuration of Unit Pixel

Next, with reference to FIG. 8, an example of a circuit configuration of a unit pixel will be described. FIG. 8 illustrates an example of the circuit configuration of the unit pixel according to an embodiment of the present disclosure. As illustrated in FIG. 8, a unit pixel 121 according to the embodiment of the present disclosure includes a photoelectric conversion section such as a photodiode (PD) and four pixel transistors. The four pixel transistors include, for example, a transfer transistor Tr11, a reset transistor Tr12, an amplification transistor Tr13, and a selection transistor Tr14. Such pixel transistors include, for example, an n-channel MOS transistor.

The transfer transistor Tr11 is coupled between a cathode of the photodiode PD and a floating diffusion section FD. Signal charges (in this case, electrons) accumulated here through photoelectric conversion in the photodiode PD are transferred to the floating diffusion section FD by applying a transfer pulse φTRG to the gate. Note that, a reference sign Cfd schematically represents parasitic capacitance of the floating diffusion section FD.

In the reset transistor Tr12, a drain is coupled to a power source VDD, and a source is coupled to the floating diffusion section FD. In addition, before transferring the signal charge from the photodiode PD to the floating diffusion section FD, an electric potential of the floating diffusion section FD is reset by applying a reset pulse φRST to the gate.

In the amplification transistor Tr13, a gate is coupled to a floating diffusion section FD, a drain is coupled to the power source VDD, and a source is coupled to a drain of the selection transistor Tr14. The amplification transistor Tr13 outputs an electric potential of the floating diffusion section FD to the selection transistor Tr14 as a reset level after being reset by the reset transistor Tr12. Furthermore, the amplification transistor Tr13 outputs an electric potential of the floating diffusion section FD as a signal level to the selection transistor Tr14 after the signal charge is transferred by the transfer transistor Tr11.

In the selection transistor Tr14, for example, a drain is coupled to the source of the amplification transistor Tr13, and a source is coupled to a vertical signal line 9. In addition, the selection transistor Tr14 is turned on by applying a selection pulse φSEL to the gate, and outputs a signal outputted from the amplification transistor Tr13 to the vertical signal line 9. Note that, the selection transistor Tr14 may be configured to be coupled between the power source VDD and the drain of the amplification transistor Tr13.

Note that, in a case where the solid state imaging device 1 according to the present embodiment is configured as the multi-layer solid state imaging device, for example, elements such as the plurality of MOS transistors, the photodiode, and the like are formed in the sensor die 23021 illustrated in B or C of FIG. 2. In addition, the transfer pulse, the reset pulse, the selection pulse, and the power source voltage are supplied from the logic die 23024 illustrated in B or C of FIG. 2. In addition, the elements disposed in a rear stage from the vertical signal line 9 coupled to the drain of the selection transistor, the elements disposed in a rear stage from the vertical signal line 9 coupled to the drain of the selection transistor are included in the logic circuit 23014 and formed in the logic die 23024.

With reference to FIG. 8, the example of the circuit configuration of the unit pixel has been described above.

1.4. Encryption Process

Next, a solid state image sensor that internally completes an encryption process will be described. There has been technologies of generating an encryption key in an imaging device on the basis of unique information that is specific to a solid state image sensor. However, there is a possibility that the unique information used for the encryption will be leaked if the unique information is outputted from the solid state image sensor and encryption is performed by a functional block different from the solid state image sensor.

Therefore, the solid state imaging device 1 according to the present embodiment internally completes an encryption process using unique information without outputting the unique information to the outside.

1.4.1. Configuration Example

FIG. 9 is an explanatory diagram illustrating a functional configuration example of a solid state image sensor according to a first embodiment of the present disclosure. FIG. 9 illustrates a functional configuration example of the solid state imaging device 1 that internally completes the encryption process using unique information. Next, with reference to FIG. 9, the functional configuration example of the solid state image sensor according to the first embodiment of the present disclosure will be described.

As illustrated in FIG. 9, the solid state imaging device 1 according to the first embodiment of the present disclosure includes a drive controller 210, a pixel array section 211, a clip circuit 215, a reference signal generator 216, a current source 217, a detector 218, a unique value calculator 220, an encryptor 222, and a communication controller 224. The pixel array section 211 includes an imager 212 and a unique information generator 214, and includes predetermined rows and columns.

The drive controller 210 generates a signal for driving the imager 212 and the unique information generator 214 (to be described later) on the basis of a predetermined input clock and data, and drives the imager 212 and the unique information generator 214. The drive controller 210 may include, for example, the control circuit 8, the vertical driving circuit 4, and the horizontal driving circuit 6 included in the solid state imaging device 1 described with reference to FIG. 1. In addition, the drive controller 210 may be installed in the control circuit 23013 illustrated in FIG. 2.

The drive controller 210 may have a function of switching between driving of the imager 212 and driving of the unique information generator 214 when driving the pixel array section 211. The drive controller 210 having the function of switching between driving of the imager 212 and driving of the unique information generator 214 makes it possible to share circuits of the imager 212 and the unique information generator 214. In addition, because the drive controller 210 has the function of switching between driving of the imager 212 and driving of the unique information generator 214, a special element for generating the unique information is not necessary, and this makes it difficult to analyze a unique value.

In addition, it is also possible for the drive controller 210 to have a function of separating an element to be driven to output an image from an element to be driven to detect element-specific information in the pixel array section 211. The drive controller 210 having the function of separating the element to be driven to output an image from the element to be driven to detect element-specific information prevents leakage of the element-specific information.

In addition, in driving to detect the element-specific information, it is also possible for the drive controller 210 to perform control for driving by using bias current different from current used for driving to output an image. It is possible to perform driving appropriately for stable acquisition of a unique value when the drive controller 210 performs control for driving to detect the element-specific information by using bias current different from current used for driving to output an image. Specifically, for example, driving of the MOS transistor 161 (LOAD1) and the MOS transistor 162 (LOAD2) in the circuit illustrated in FIG. 7 is differentiated, between the time of driving for detecting the element-specific information and the time of driving for outputting an image. By changing driving of the MOS transistor 161 (LOAD1) and the MOS transistor 162 (LOAD2), it is possible to change characteristics of an amplification transistor AMP. By the drive controller 210 performing control for driving to detect the element-specific information by using bias current corresponding to a temperature, it is possible to perform driving appropriately for more stable acquisition of a unique value.

It is also possible for the drive controller 210 to perform control for driving by using bias current corresponding to a chip temperature of the solid state imaging device 1 in driving to detect the element-specific information by using bias current different from current used for driving to output an image.

In the pixel array section 211, unit pixels including predetermined rows and columns are arrayed. The pixel array section 211 is configured to output data by using a source follower circuit.

The imager 212 includes a pixel array in which pixels including a plurality of photoelectric conversion sections are arrayed in a two-dimensional array form. The imager 212 is driven by the drive controller 210 and outputs an analog signal. A circuit configuration of each pixel in the imager 212 is the circuit configuration illustrated in FIG. 8, for example.

In the unique information generator 214, circuits having the same configuration as the pixel installed in, for example, the imager 212 are unidimensionally arrayed. The unique information generator 214 is driven by the drive controller 210 and outputs an analog signal. The circuit formed as the unique information generator 214 may be created through a production process that is substantially same as a production process of the pixel installed in the imager 212. In addition, the drive controller 210 may switch between driving of the imager 212 and driving of the unique information generator 214.

The unique information generator 214 may be a pixel installed in an optical black (OPB) region in the pixel array. Respective elements in the circuit configured as the unique information generator 214 have physical production variations. The solid state imaging device 1 according to the first embodiment of the present disclosure uses an analog signal outputted from the unique information generator 214 as a basis of uncopiable unique information (element-specific information).

An example of a generation source of the analog signal outputted from the unique information generator 214 will be described. Next, the description will be given on the assumption that the unique information generator 214 has a similar configuration to the pixel 121 illustrated in FIG. 7 or FIG. 8.

(Photodiode PD)
The photodiode PD includes a noise component caused by crystal defects that occur through production. The crystal defects cause variations of dark current. The crystal defects appear as fixed pattern noise.

(Selection Transistor SEL)
A selection transistor SEL includes a noise component caused by variation of threshold voltage Vth. The variation of the threshold voltage Vth is caused by its structure such as an oxide film, a channel width, a channel length, or impurities. The variation of the threshold voltage Vth appears as fixed pattern noise.

(Reset Transistor RST)
A reset transistor RST also includes a noise component caused by variation of threshold voltage Vth. The variation of the threshold voltage Vth is caused by its structure such as an oxide film, a channel width, a channel length, or impurities. The variation of the threshold voltage Vth appears as fixed pattern noise.

(Floating Diffusion Section FD)
The floating diffusion section FD includes a noise component caused by crystal defects that occur through production. The crystal defects cause variations of dark current. The crystal defects appear as fixed pattern noise. When the reset transistor RST is switched from ON to OFF, kTC noise (reset noise) appears in the floating diffusion section FD. The kTC noise occurs temporarily. When the reset transistor RST is switched from ON to OFF, feedthrough appears in the floating diffusion section FD. The feedthrough is caused by variation of parasitic capacitance or a threshold value, and the feedthrough appears as fixed pattern noise.

(Amplification Transistor AMP)
The amplification transistor AMP also includes a noise component caused by variation of threshold voltage Vth. The variation of the threshold voltage Vth is caused by its structure such as an oxide film, a channel width, a channel length, or impurities. The variation of the threshold voltage Vth appears as fixed pattern noise. In addition, the amplification transistor AMP also includes a noise component caused by overdrive voltage, a noise component caused by thermal noise, a noise component caused by 1/f noise, and a noise component caused by random telegraph noise (RTN). It is considered that the RTN is caused by electric charge trapping/detrapping due to defects in an oxide film. Whether or not the oxide film includes a defect is unique variation. However, what is observed is binary or multivalued temporal signal level fluctuation.

Such a noise component is transmitted to the detector 218 in a rear stage via a signal line (VSL). In normal driving, among such noise components, a noise component that is not changed between before and after transfer of the signal is removed through a CDS process. In the present embodiment, when generating a unique value, the solid state imaging device 1 does not remove such a noise component, but uses such a noise component as element-specific information serving as a basis of the unique value. It is possible for the solid state imaging device 1 to generate a unique value that is less easily analyzed, because the noise component included in the analog signal outputted from the unique information generator 214 is used as the basis of the unique value.

The unique information generator 214 may be installed at a position (light shielded position) out of reach of light from the outside, for example. It is possible for the solid state imaging device 1 to stably generate the unique information without being affected by outside light because the unique information generator 214 is installed at a light shielded position. In addition, it is also possible for the unique information generator 214 to include one or a plurality of rows of circuits. The number of the circuits is the same as the number of columns of the pixel array of the imager 212. In addition, the unique information generator 214 may include a row selection switch to be operated by a control signal from the drive controller 210.

The clip circuit 215 is a circuit that is arrayed in n-number of columns. The n-number is the same as the number of columns of the pixel array section 211. The clip circuit 215 is a source follower circuit coupled to a source follower circuit of the pixel array section 211 in parallel. The clip circuit 215 has a clip function that allows voltage (VSL voltage) of an output line for each column to fall within a predetermined range.

FIG. 10A is an explanatory diagram illustrating a circuit configuration example of the clip circuit 215. The clip circuit 215 is a source follower circuit that is able to select a row. The source follower circuit is coupled to output lines VSL in parallel with the pixels. The clip circuit 215 includes transistors CLPSEL and CLPAMP corresponding to respective output lines VSL. The transistor CLPSEL is a transistor that operates linearly, and performs control to couple a source of the transistor CLPAMP to the output line VSL. The control is performed by a clip selection pulse. The transistor CLPAMP is a transistor that operates in a saturation state. In a way similar to the amplification transistor AMP of the pixel, the transistor CLPAMP outputs a signal corresponding to input when the current source applies bias current. Input is provided by clip voltage. In general, the input is an intermediate electric potential of about 1 V to about 2 V.

In a selected state, the bias current is preferentially applied to the clip circuit 215 when output voltage of a source follower (pixels in a selected row) coupled to the output line VSL becomes lower than voltage outputted depending on clip voltage. As a result, the source follower output of the pixels of the selected row does not function, and voltage of the output line VSL is clipped to an output level corresponding to the clip voltage. With regard to the clip voltage, DC voltage common to unit clip circuits for respective columns is supplied. At this time, in a way similar to the pixel source follower, a threshold value or overdrive voltage varies individually.

The reference signal generator 216 averages VSL voltages outputted by the clip circuit 215 for respective columns and outputs the averaged voltage. The current source 217 is a circuit for applying constant current and outputting VSL voltage, and is driven by a current control voltage generator 219. The current sources 217 are arrayed in n number of columns, and forms the amplification transistor and the source follower circuit in the unit pixel. The current control voltage generator 219 generates current control voltage by using a band-gap reference circuit in a manner that current values of the current sources 217 do not depend on a temperature.

The detector 218 performs a signal process for converting an analog signal outputted from the unique information generator 214 into a digital signal. The detector 218 includes a comparator 231, a DA converter 232, and a counter 233. The comparator 231 compares VSL voltage outputted from the current source 217 with a reference waveform outputted from the DA converter 232, and converts the voltage into time. The comparator 231 includes an input capacitance installed at an input side and a switch that shorts input and output of the comparator 231. The DA converter 232 generates a reference waveform to be supplied to the comparator 231. The counter 233 has a function of counting until output of the comparator 231 is inverted, and converting time into the number of counts.

The detector 218 outputs the digital signal obtained through the conversion to the unique value calculator 220. In addition to the function of converting an analog signal into a digital signal, the detector 218 may have a function of performing a differencing process on two input signals, and a function of removing variation that has occurred by the detector 218 itself. Because the detector 218 has the function of removing variation that has occurred by the detector 218 itself, excessive variation does not occur in a signal from the unique information generator 214. This makes it possible to improve quality of a signal serving as a basis of a unique value. In addition, it is also possible for the detector 218 to perform a column parallelism process on an analog signal outputted from the unique information generator 214, or perform a pixel parallelism process.

The detector 218 may include a capacitance that clamps an electric potential of a signal line and a switch for setting an end of the capacitance to a reference electric potential. Specifically, the detector 218 may include a switch that couples ends of capacitive elements installed on input sides of the comparators 141 and 151 in the ADC 113 illustrated in FIG. 7, to output sides of the comparators 141 and 151. Because the switch couples the ends of the capacitive elements to the output sides of the comparators 141 and 151, a diode-coupled transistor is generated among transistors included in the comparators 141 and 151. This makes it possible to set the end of the capacitance that clamps the electric potential of the signal line to a predetermined reference electric potential. Therefore, it is possible to remove the variation in an analog region. In addition, it is possible for the detector 218 to perform a differencing process on a digital value after the AD conversion. Through the differencing process of the digital value after the AD conversion, it is possible for the detector 218 to remove variation in a digital region.

In addition, the detector 218 may have a function of shifting a level of clamp as described later. By shifting the level of clamp, it is possible for the detector 218 to optimize distribution of analog values around a predetermined reference when converting an analog value to a digital value. By optimizing the distribution of analog values, it is possible to losslessly obtain unique information outputted from the unique information generator 214.

In a case where a plurality of the detectors 218 is arrayed, each of the detectors 218 may have a function of getting a difference between a signal inputted to each of the detector 218 and a reference signal that is common to the plurality of detectors 218. In this case, the reference signal common to the plurality of detectors 218 may be substantially the same as an average of the signals inputted to the respective detectors 218.

Memory for temporarily holding unique information outputted from the unique information generator 214, especially, analog memory may be interposed between the unique information generator 214 and the detector 218. The analog memory may be parasitic capacitance of the signal line as described later. In addition, in a case where the analog memory is interposed between the unique information generator 214 and each of the plurality of detectors 218, it is possible to provide a switch that shorts the analog memories. It becomes easy to generate the unique information, and because the analog memories are shorted and averaged, the unique information held by each analog memory is deleted.

FIG. 10B is an explanatory diagram illustrating a circuit configuration example of the reference signal generator 216, the current source 217, and the comparator 231. FIG. 10B illustrates an (n−1)-th output line VSL(n−1), an n-th output line VSL(n), and an (n+1)-th output line VSL(n+1).

On the output line VSL(n−1), switches 251a and 252a are provided as the reference signal generator 216. In addition, parasitic capacitance 253a is provided on the output line VSL(n−1). On the output line VSL(n), switches 251b and 252b are provided as the reference signal generator 216. In addition, parasitic capacitance 253b is provided on the output line VSL(n). On the output line VSL(n+1), switches 251c and 252c are provided as the reference signal generator 216. In addition, parasitic capacitance 253c is provided on the output line VSL(n+1).

As the current source 217, a transistor 261a is coupled to an end of the switch 252a, a transistor 261b is coupled to an end of the switch 252b, and a transistor 261c is coupled to an end of the switch 252c.

On the output line VSL(n−1), input capacitances 271a and 272a, switches 273a and 274a, and a comparator 275a are provided as the comparator 231. On the output line VSL(n), input capacitances 271b and 272b, switches 273b and 274b, and a comparator 275b are provided as the comparator 231. On the output line VSL(n+1), input capacitances 271c and 272c, switches 273c and 274c, and a comparator 275c are provided as the comparator 231.

FIG. 11 is an explanatory diagram illustrating a timing chart of operations of the reference signal generator 216, the current source 217, and the comparator 231 for generating unique information. Next, operations of respective elements provided on or along the output line VSL(n−1) will be described. Note that, the operations performed by the reference signal generator 216, the current source 217, and the comparator 231 to generate the unique information are not limited to the operations illustrated in FIG. 11.

At a time t1, a horizontal readout period starts. At this time, a row selection signal φSEL becomes high, and row selection starts. At this time, the reset transistor RST is in the ON state. Therefore, voltage of the floating diffusion section FD is fixed to VDD. This makes it possible to remove variation of the floating diffusion section FD. In addition, a transfer pulse φTRG is fixed to a low state when generating unique information. The transfer pulse φTRG fixed to the low state makes it possible to turn off the transfer transistor TRG, and this makes it possible to remove variation of the photodiodes PD.

In addition, at the time t1, a current source separation pulse for separating the current source 217 is high, and the switch 252a is in the ON state. In addition, at the time t1, a VSL averaging pulse for averaging VSL voltage is low, and the switch 251a is in the OFF state. This makes it possible to output variation information for each source follower to the output lines VSL even during source follower operation.

At a time t2, the row selection signal (selection pulse) φSEL and the current source separation pulse become low at the same time, and the parasitic capacitance 253a of VSL holds VSL voltages of respective columns. In addition, at the time t2, a VSL averaging pulse becomes high, and the VSL voltages of the respective columns are averaged. The averaged VSL voltage is a reference signal.

At a time t3, the input capacitance 272a is charged by an internal offset of the comparator 275a and a difference between VSL voltage and a reference waveform, and an operating point of the comparator 275a is initialized.

At a time t4, a shorting pulse becomes low, and the switches 273a and 274a are turned off. Accordingly, the kTC noise and feedthrough variation occur in the switches 273a and 274a.

A period between a time t5 and a time t6 is a first AD conversion period (ADC period 1). In this period, the DA converter 232 linearly changes the reference waveform at a predetermined gradient. Next, the comparator 275a performs AD conversion on the reference signal by using the reference waveform. The DA converter 232 may have a function of shifting the reference waveform. In other words, the DA converter 232 may have a function of shifting a clamp level. By shifting the reference waveform, it is possible for the DA converter 232 to provide an offset to the output of the counter 233. In the ADC period 1, inverting delay of the comparator 275a, delay of the reference waveform, and clock delay of the counter occur. Note that, in FIG. 11, a triangle indicates an inversion timing of the comparator 275a.

When the ADC period 1 ends at the time t6, the row selection signal φSEL becomes high, and the current source separation pulse becomes high, and the VSL averaging pulse becomes low. In other words, the switch 251a is turned off, and the switch 252a is turned on. This makes it possible to output variation information for each source follower (variation of output of the amplification transistor) to the output lines VSL even during source follower operation.

A period between a time t7 and a time t8 is a second AD conversion period (ADC period 2). Also in this period, the DA converter 232 linearly changes the reference waveform at a predetermined gradient. Next, the comparator 275a performs AD conversion on the reference signal by using the reference waveform. Here, in a similar way, a digital value obtained after conversion includes kTC noise and feedthrough variation that occurred in the switches 273a and 274a at the time t4, and includes inverting delay of the comparator 275a, delay of the reference waveform, and clock delay of the counter that occurred in the ADC period 1. Note that, in FIG. 11, a triangle indicates an inversion timing of the comparator 275a.

Then, when the ADC period 2 ends, a differencing process of a count value of the counter 233 obtained in the ADC period 1 and a count value of the counter 233 obtained in the ADC period 2 is performed. The differencing process makes it possible to remove variation that has occurred in the detector 218. Therefore, it is possible to prevent element-specific information from including variation that has occurred in the detector 218.

In addition, in the ADC period 1, because the output of the counter 233 is provided with the offset, the variation caused by the unique information generator 214 is not lost even if the above-described differencing process is performed. The variations caused by the unique information generator 214 are normally distributed around the reference signal. Therefore, if there is no offset, a negative value appears in the variations caused by the unique information generator 214, and all the values equal to or less than 0 are treated as 0.

At the time of AD conversion, it is desirable to adjust the gradient of the reference waveform (analog gain adjustment) to obtain a desired digital value. In addition, to read out the element-specific information, it is possible to make a current (drain current Id) of the current source smaller than a current used for usual readout. The overdrive voltage is able to be calculated by $2 \times Id/gm$. However, the variations are also proportional to the overdrive voltage. Therefore, when the drain current Id gets smaller, a variation component of the overdrive voltage included in the source follower relatively decreases. In other words, it is possible to mainly detect information of variations of a threshold value of the amplification transistor AMP. In addition, to read out the element-specific information, it is possible to make a current (drain current Id) of the current source larger than a current used for usual readout. By making the current of the current source larger, it is also possible to make the variation component of the overdrive voltage relatively larger among variation information included in the source follower.

Thermal noise of the amplification transistor AMP, 1/f noise, RTN, and thermal noise of peripheral circuits are included as temporal noise. However, it is possible to suppress them by performing readout more than once and doing addition (averaging).

To suppress time degradation, it is desirable for the solid state imaging device 1 to control driving under the following conditions. Small current is desirable at the time of operation in view of hot carrier injection. In other words, it is desirable to perform control in a manner that the bias current gets smaller. In a similar way, short operation time is desirable in view of hot carrier injection. For example, it is desirable to perform control for driving only at a time of activation or when requested. In addition, in a similar way, it is desirable to apply no current while being unused in view of hot carrier injection. In other words, it is desirable to turn off the selection transistor SEL while being unused. In addition, in view of a breakdown of an oxide film, it is desirable to reduce voltage difference between a gate and a source or a drain of a target element while being unused. In other words, it is desirable to turn on the reset transistor RST while being unused. In addition, in view of substrate hot carrier injection, it is desirable to block light incident on the unique information generator 214.

A high-level electric potential of the selection pulse φSEL may be substantially VDD (2.7 V). Alternatively, the high-level electric potential of the selection pulse φSEL may be an intermediate electric potential (about 1 V to about 1.5 V). The source follower is obtained by using an electric potential difference (VDS) between the drain and the source of the selection transistor SEL and operating in a saturation state. For example, assuming that the drain voltage of the selection transistor SEL is 2.7 V, in general, a drain side of the selection transistor SEL (source side of the amplification transistor AMP) has about 2.2 V. On the other hand, it is possible to operate in the saturation state by using a sufficient VDS of the selection transistor SEL (at least a difference of about several hundreds to about 700 mV). This makes it possible to transmit output corresponding to the gate voltage of the selection transistor SEL to the output line VSL. In a way similar to the amplification transistor AMP, threshold values and overdrive voltage of the selection transistor SEL vary between respective elements when operating in the saturated state. Therefore, it is possible to detect the variation of the threshold value and the overdrive voltage of the selection transistor SEL. In this case, the selection switches are turned off with regard to the clip circuit 215 and the pixels in non-selected rows. Therefore, they are not involved in the readout.

The unique value calculator 220 calculates a value (unique value) specific to the solid state imaging device 1 on the basis of the digital signal sent from the detector 218. The unique value calculator 220 generates a value having a predetermined bit length as the unique value. An example of a method for calculating the unique value of the solid state imaging device 1 by the unique value calculator 220 will be described later. When the unique value of the solid state imaging device 1 is calculated, the unique value calculator 220 sends the unique value to the encryptor 222. The unique value generated by the unique value calculator 220 may be used as a key itself or a seed to be used in the encryption process performed by the encryptor 222.

Among a plurality of pieces of element-specific information, the unique value calculator 220 may select which piece of element-specific information to use. When selecting a piece of element-specific information to use, the unique value calculator 220 may select which piece of element-specific information to use through computation based on the element-specific information, or may select which piece of element-specific information to use by using a random number. In addition, non-volatile memory may store a selection condition for selecting a piece of element-specific information. The selection condition may be written into the non-volatile memory only once. Examples of a timing of writing the selection condition into the non-volatile memory include an inspection timing, a shipment timing, a first usage timing, and the like. The unique value calculator 220 is able to repeatedly calculate unique values by using element-specific information based on any production variation that occurs in a chip of the solid state imaging device 1, including element-specific information having relatively small amount of information. In other words, it is possible to increase amount of information of the element-specific information.

Alternatively, it is also possible for the unique value calculator 220 to calculate a unique value by combining a plurality of pieces of element-specific information among pieces of element-specific information generated by the unique information generator 214. It becomes difficult to analyze how the unique value has been calculated, by calculating the unique value by combining the plurality of pieces of element-specific information.

In addition, it is also possible for memory to temporarily store the unique value generated by the unique value calculator 220. Because the memory stores the unique value generated by the unique value calculator 220, a calculation timing of the unique value becomes less likely to be analyzed. In other words, instead of generating the unique value at an encryption request timing, the solid state imaging device 1 may use a unique value that has been generated in advance, in response to an encryption request. The solid state imaging device 1 may calculate a unique value after a predetermined period of time has elapsed since driving performed at a time of usual image capturing, for example. In addition, the solid state imaging device 1 may generate the unique value not at the encryption request timing but at a timing at which a unique value generation request is received.

In addition, the unique value calculator 220 may average unique values obtained under a same driving condition. By averaging the unique values obtained under the same driving condition, it is possible to suppress noise in a temporal direction.

The encryptor 222 performs an encryption process of data by using the unique value generated by the unique value calculator 220. The encryptor 222 may be provided in the logic circuit 23014 illustrated in FIG. 2, for example. Specifically, the encryptor 222 performs the encryption process of data by using the unique value generated by the unique value calculator 220 as the seed or the key itself. Examples of a target of the encryption include the unique value itself, image information, a feature amount based on the image information, and the like. It is possible for the solid state imaging device 1 to very securely encrypt data by performing the encryption process using the unique value generated by the unique value calculator 220.

The communication controller 224 transmits the data to an outside of the solid state imaging device 1. The communication controller 224 may perform different processes in a case of outputting the imaging data and in a case of outputting data encrypted by the encryptor 222.

Among the structural elements of the solid state imaging device 1 illustrated in FIG. 9, at least paths for processing unique information are formed to be hidden from the surface of the solid state imaging device 1. For example, the paths for processing unique information are disposed to be covered with metal in an upper layer including an uppermost layer. The paths for processing unique information may be covered with a predetermined shield layer, or may be covered with a wiring line of VSS or VDD. Examples of the paths for processing unique information may include the unique information generator 214, the detector 218, the unique value calculator 220, and the encryptor 222. In addition, the solid state imaging device 1 is formed in a manner that a pad for monitoring unique information is not provided in the paths for processing unique information. Because the solid state imaging device 1 is formed as described above, it is possible to prevent leakage of the unique information of the solid state imaging device 1 to the outside, the unique information being used for the encryption process. In addition, if someone tries to analyze the unique information, he/she has to destroy the solid state imaging device 1. As a result, it is not possible to analyze the unique information. In addition, the solid state imaging device 1 according to the present embodiment does not hold the unique information therein. The solid state imaging device 1 generates unique information in each case, and performs the encryption process using a unique value based on the generated unique information. Therefore, the solid state imaging device 1 according to the present embodiment is able to perform a very secure encryption process.

The solid state imaging device 1 according to the present embodiment does not hold unique information therein. Therefore, it is not possible to decrypt the encrypted data if the unique value changes each time the unique value is generated on the basis of the unique information. Therefore, it is necessary for the unique value to be the same value no matter when the unique value is calculated. Therefore, it is also possible for the solid state imaging device 1 according to the present embodiment to have a function of correcting a unique value calculated by the unique value calculator 220 on the basis of a signal outputted from the unique information generator 214 in accordance with a temperature of a chip in which the unique information generator 214 is installed. In addition, it is also possible for the solid state imaging device 1 according to the present embodiment to have a function of detecting the temperature of the chip in which the unique information generator 214 is installed.

FIG. 12 is an explanatory diagram illustrating another functional configuration example of the solid state imaging device 1 according to the present embodiment. FIG. 12 illustrates a configuration including a chip temperature detector 226 and a signal corrector 228 in addition to the structural elements of the solid state imaging device 1 illustrated in FIG. 9.

The chip temperature detector 226 detects a temperature of a chip in which the unique information generator 214 is installed. The chip temperature detector 226 sends information of the detected temperature of the chip to the signal corrector 228. The signal corrector 228 corrects a unique value calculated by the unique value calculator 220 on the basis of the temperature of the chip in which the unique information generator 214 is installed. The temperature has been detected by the chip temperature detector 226. The signal corrector 228 may hold a table in which correction values corresponding to temperatures are stored, and may decide a correction value on the basis of the temperature detected by the chip temperature detector 226.

1.4.2. Operation Example

Next, an operation example of the solid state imaging device according to the present embodiment will be described. FIG. 13 is a flowchart illustrating an operation example of the solid state imaging device according to the present embodiment. FIG. 13 illustrates an example of operation performed when the solid state imaging device 1 calculates a unique value and performs the encryption process by using the unique value.

First, the solid state imaging device 1 generates analog unique information that is a basis of a unique value (Step S201). The analog unique information is generated by the drive controller 210 driving the unique information generator 214.

After the analog unique information is generated, the solid state imaging device 1 subsequently converts the analog unique information into a digital value (Step S202). The detector 218 converts the analog unique information into the digital value. The detector 218 performs the process of converting the analog unique information into the digital value as described above.

After the analog unique information is converted into the digital value, the solid state imaging device 1 subsequently calculates a unique value of the solid state imaging device 1 by using the digital value obtained after the conversion (Step S203). The unique value calculator 220 calculates the unique value of the solid state imaging device 1.

After the unique value of the solid state imaging device 1 is calculated, the solid state imaging device 1 subsequently performs an encryption process of data by using the unique value (Step S204). The encryptor 222 performs the encryption process of the data by using the unique value.

By performing the series of operations described above, it is possible for the solid state imaging device 1 according to the present embodiment to internally complete the encryption process by using unique information without outputting the unique information to the outside. The solid state imaging device 1 according to the present embodiment performs the encryption process by using the unique information that is not leaked to the outside. This makes it possible to output important information that has been encrypted in a highly secure way.

1.5. Biometric Authentication Process

Next, a biometric authentication process using the solid state imaging device 1 according to the present embodiment and control of the solid state imaging device 1 will be described. Before details of the biometric authentication process using the solid state imaging device 1 according to the present embodiment and control of the solid state imaging device 1 will be described, a comparative example will be described first for understanding of the present embodiment.

1.5.1. Comparative Example

FIG. 14 is an explanatory diagram illustrating the comparative example of the present embodiment. FIG. 14 illustrates an information processing apparatus 1000 including a lens module 1001, a solid state imaging device 1002, and an application processor 1003. The solid state imaging device 1002 converts light passed through the lens module 1001 into an electrical signal. The application processor 1003 performs an image process using the electrical signal outputted from the solid state imaging device 1002, especially, a biometric authentication process. The biometric authentication process includes a living body detection process of determining whether or not a captured image includes a living body, an iris authentication process of recognizing an iris of a person and determining whether the recognized iris matches iris information registered in advance, and the like. The description will be given on the assumption that the information processing apparatus 1000 performs the iris authentication process as the biometric authentication process.

The application processor 1003 includes an iris authenticator 1010, an iris information storage 1020, and an imaging condition controller 1030. The iris authenticator 1010 uses the electrical signal outputted from the solid state imaging device 1002. The iris information storage 1020 stores iris information of an authentication target in advance. The imaging condition controller 1030 controls imaging conditions such as a focus and exposure to improve accuracy of the iris authentication process performed by the iris authenticator 1010. In addition, the iris authenticator 1010 includes a region detector 1011, an iris extractor 1012, and an iris matching section 1013. The region detector 1011 detects a region of an eye of a person, especially, a region of an eyeball from an electrical signal outputted from the solid state imaging device 1002. The iris extractor 1012 extracts iris information of the person from the region of the eye of the person detected by the region detector 1011. The iris matching section 1013 checks the iris information extracted by the iris extractor 1012 against the iris information stored in the iris information storage 1020. For example, Inter-Integrated Circuit (I2C) communication may be used as communication from the application processor 1003 to the lens module 1001 and the solid state imaging device 1002.

To improve the accuracy of the iris authentication process performed by the iris authenticator 1010, it is necessary to accurately extract iris information from the electrical signal outputted from the solid state imaging device 1002. In a case where the region detector 1011 has not detected a position of an eye of a person or in a case where the iris extractor 1012 has not extracted iris information, the imaging condition controller 1030 performs control to focus on the eye, lengthen exposure time, or improve gain at a time of capturing an image. At this time, if the control is performed to set appropriate exposure for a target by averaging luminance in the whole region of electrical signals outputted from, for example, the solid state imaging device 1002 as an evaluation value, there is a possibility that the appropriate exposure is not applied to the iris itself because it depends on factors such as a color of skin, presence/absence of glasses, eyelashes, use or nonuse of makeup, other than the iris. Therefore, the imaging condition controller 1030 is able to focus on a region of an eyeball by using information of the region of the eyeball of the person detected by the region detector 1011, and is able to set exposure for acquiring iris information by performing control to set appropriate exposure for a target by averaging luminance of only the iris region as an evaluation value.

However, as illustrated in FIG. 14, it takes time before completion of control for preparing the imaging conditions appropriate for the iris authentication process in a case where the application processor 1003 controls the imaging conditions of the lens module 1001 and the solid state imaging device 1002. One reason for this is that a communication speed between the solid state imaging device 1002 and the application processor 1003 and communication traffic of the electrical signals from the solid state imaging device 1002 to the application processor 1003 are limited.

Therefore, in the present embodiment, control is performed to prepare appropriate imaging conditions for the iris authentication process in the solid state imaging device 1. It is possible to shorten time it takes to complete control to prepare the appropriate imaging conditions for the iris authentication process, by performing the control to prepare appropriate imaging conditions for the iris authentication process in the solid state imaging device 1.

1.5.2. Configuration Example

FIG. 15 is an explanatory diagram illustrating a configuration example of an information processing apparatus 300 including the solid state imaging device 1 according to the present embodiment. Next, the configuration example of the information processing apparatus 300 according to the present embodiment will be described with reference to FIG. 15.

The information processing apparatus 300 according to the present embodiment is an apparatus that authenticates a person by using iris information of the person. The information processing apparatus 300 may be a mobile terminal such as a smartphone or a tablet terminal, for example, an authentication apparatus included in an immigration system installed in an airport or the like, or an unlocking apparatus for unlocking a door or a steering wheel of a vehicle. As illustrated in FIG. 15, the information processing apparatus 300 according to the present embodiment includes the lens module 1001 and the solid state imaging device 1 that converts light passed through the lens module 1001 into an electrical signal.

The solid state imaging device 1 includes an imaging controller 301, an iris authenticator 310, an iris information storage 320, an imaging condition controller 330, an application processor 370, and a display 380.

The imaging controller 301 controls respective structural elements of the solid state imaging device 1 and causes them to perform processes related to readout of image data (pixel signal) and the like. The imaging controller 301 controls time (that is, exposure time or shutter speed) it takes to read out an electrical signal from pixels (for example, the pixel array 3 illustrated in FIG. 1). The electrical signal is obtained through conversion of light passed through the lens module 1001. Note that, the imaging condition controller 330 performs control related to automatic exposure (AE) for automatically obtaining exposure corresponding to brightness of a subject. Information of exposure time decided by the imaging condition controller 330 is reflected in the imaging controller 301. In addition, to focus on the subject, the imaging condition controller 330 also controls driving (AF) of an actuator (not illustrated) that drives lenses included in the lens module 1001. Information related to positions of the lenses decided by the imaging condition controller 330 is reflected in the lens module 1001.

The iris authenticator 310 performs an iris authentication process using image data generated by the solid state imaging device 1. The iris authenticator 310 includes a region detector 311, an iris extractor 312, and an iris matching section 313. The region detector 311 detects a region of an eye of a person, especially, a region of an eyeball from the image data. The iris extractor 312 extracts iris information of the person from the region of the eye of the person detected by the region detector 311. The iris matching section 313 checks the iris information extracted by the iris extractor 312 against the iris information stored in advance in the iris information storage 320.

The region detector 311 detects a region of an eye of the person, especially, a region of an iris or a pupil of an eyeball from the image data generated by the solid state imaging device 1. The region detector 311 detects the region of the eyeball through pattern matching or the like, for example.

The iris extractor 312 extracts iris information of the person from the region of the eye of the person detected by the region detector 311. The iris extractor 312 extracts the iris information through a filter process such as a Gabor filter, for example. The iris matching section 313 checks the iris information extracted by the iris extractor 312 against the iris information stored in advance in the iris information storage 320.

The information processing apparatus 300 according to the present embodiment is able to complete the iris authentication process in the solid state imaging device 1. Therefore, although it is possible for the iris authenticator 310 to output the image data to the application processor 370 in a rear stage, the iris authenticator 310 may output only a result of the iris authentication to the application processor 370. By outputting only the result of the iris authentication to the application processor 370, it is possible for the information processing apparatus 300 according to the present embodiment to perform the iris authentication process without leaking the image data including images of faces of people to the outside of the solid state imaging device 1.

The imaging condition controller 330 controls imaging conditions such as a focus and exposure by using information obtained through the iris authentication process performed by the iris authenticator 310. For example, if the eyeball is not focused on when the region detector 311 detects a region of an eyeball from image data, the imaging condition controller 330 receives information from the region detector 311, the information indicating that the eyeball is not focused on. Next, the imaging condition controller 330 instructs the lens module 1001 to drive an actuator (not illustrated) that drives lenses (not illustrated) included in the lens module 1001 in a manner that the eyeball is focused on. In addition, for example, in a case where it is not possible to extract the iris information because of overexposure or lack of exposure when the iris extractor 312 extracts the iris information, the imaging condition controller 330 receives information indicating overexposure or underexposure from the iris extractor 312. Next, the imaging condition controller 330 instructs the imaging controller 301 to perform control to slow the shutter speed to lengthen the exposure time, or increase gain to obtain exposure sufficient to extract the iris information.

To extract the iris information, the iris extractor 312 uses the Gabor filter, for example. In addition, it is possible to recognize whether the eyeball is focused on, from a magnitude of an absolute value of an output value of the filter. It is possible for the iris extractor 312 to determine that the eyeball is not focused on if the absolute value of the output value of the filter is small. Therefore, it is possible for the imaging condition controller 330 to acquire information of the absolute value of the output value of the Gabor filter from the iris extractor 312. The imaging condition controller 330 instructs the lens module 1001 to drive the actuator (not illustrated) that drives the lenses (not illustrated) included in the lens module 1001 in a manner that a large output value of the Gabor filter is obtained, that is, in a manner that the eyeball is focused on.

The information processing apparatus 300 according to the present embodiment completes the control related to the focus and exposure in the solid state imaging device 1. This enables control by an interruption or data access by using internal memory of the solid state imaging device 1. In addition, the information processing apparatus 300 according to the present embodiment is able to avoid delay in communication between chips such as I2C. As described above, by completing the control related to the focus and exposure in the solid state imaging device 1, it is possible for the information processing apparatus 300 according to the present embodiment to shorten time it takes to complete the control to prepare the appropriate imaging conditions for the iris authentication process, in comparison with the above-described comparative example. In addition, the information processing apparatus 300 according to the present embodiment is able to improve accuracy of the iris authentication process by capturing an image under the appropriate imaging conditions for the iris authentication process.

It is also possible for the information processing apparatus 300 according to the present embodiment to display a guide on the display 380 when performing the iris authentication process. The guide is for alignment of the eyes of a person to be authenticated. FIG. 16 is an explanatory diagram illustrating an example of a screen displayed on the display 380 of the information processing apparatus 300. FIG. 16 illustrates the display 380, the lens module 1001, and a light source 390 that emits light to a subject. For example, the application processor 370 causes the display 380 to display guides 381 for the alignment of the eyes. The person to be authenticated moves his/her face or the information processing apparatus 300 in a manner that the both eyes are included in the guides 381. Because the display 380 displays the guides 381 as described above, the solid state imaging device 1 only has to detect a region of an eyeball and perform a process of extracting an iris only with regard to the regions of the guides 381 when performing the iris authentication process.

In preparation for the iris authentication process, the person to be authenticated has to register iris information in advance. Needless to say, the information processing apparatus 300 according to the present embodiment is also usable for registration of the iris information. Also in a case of registering the iris information, it is possible for the information processing apparatus 300 according to the present embodiment to set the imaging conditions in the solid state imaging device 1 to obtain exposure and a focus that are suitable for extraction of the iris information.

The iris authentication process has been described above as the example of the biometric authentication process. However, the present disclosure is not limited thereto. Next, an example of an information processing apparatus including a solid state imaging device for performing a living body detection process as the biometric authentication process will be described. In the living body detection process, it is determined whether or not what is captured in an image is a living body, in other words, an actual human being, a person wearing a mask, a doll, or a photograph.

FIG. 17 is an explanatory diagram illustrating a configuration example of the information processing apparatus 300 including the solid state imaging device 1 according to the present embodiment. Next, the configuration example of the information processing apparatus 300 according to the present embodiment will be described with reference to FIG. 17.

The information processing apparatus 300 according to the present embodiment is an apparatus that performs biometric authentication by using image data. The information processing apparatus 300 may be a mobile terminal such as a smartphone or a tablet terminal, for example, an authentication apparatus included in an immigration system installed in an airport, or the like. As illustrated in FIG. 17, the information processing apparatus 300 according to the present embodiment includes the lens module 1001 and the solid state imaging device 1 that converts light passed through the lens module 1001 into an electrical signal.

The solid state imaging device 1 includes the imaging controller 301, a living body detector 340, the imaging condition controller 330, the application processor 370, and the display 380. Here, the living body detector 340 will be described, the living body detector 340 being a structural element different from the information processing apparatus 300 illustrated in FIG. 15.

The living body detector 340 performs a living body detection process using image data generated by the solid state imaging device 1. Here, the living body detection process performed by the living body detector 340 will be described.

For example, the living body detector 340 analyzes a Purkinje image by using the image data generated by the solid state imaging device 1. The Purkinje image is a corneal reflection image obtained when light from a light source is reflected on a cornea. The Purkinje image appears in the eye as long as the eye is an eye of a living person. The living body detector 340 performs the living body detection process by using luminance information or a positional relation of the Purkinje image. In a case where the living body detection process is performed by using the luminance information or the positional relation of the Purkinje image, it is desirable to control AE to obtain luminance that allows easy detection of the Purkinje image, or shorten the shutter speed to suppress a blur. Therefore, the imaging condition controller 330 instructs the imaging controller 301 to use exposure that allows easy detection of the Purkinje image when the living body detector 340 analyzes the Purkinje image in the image data.

For example, the living body detector 340 analyzes whether or not pupillary hippus has occurred by using the image data generated by the solid state imaging device 1. The pupillary hippus is repetition of slight contraction and dilatation of a pupil that occurs in an eye of a living person even in a case where ambient brightness is constant. The living body detector 340 uses information of temporal change in a radius ratio of the pupil to the iris to detect the pupillary hippus. Therefore, in a case where the living body detection process is performed by detecting the pupillary hippus, it is desirable to control AE to obtain luminance that allows easy detection of circumferences of the pupil and the iris, or shorten the shutter speed to suppress a blur. Therefore, the imaging condition controller 330 instructs the imaging controller 301 to use exposure that allows easy detection of the circumferences of the pupil and the iris when the living body detector 340 analyzes whether or not pupillary hippus has occurred from the image data.

For example, the living body detector 340 analyzes whether or not a saccade has occurred by using the image data generated by the solid state imaging device 1. The saccade is a quick movement of the eyeball. The living body detector 340 is able to analyze whether or not the saccade has occurred depending on whether a movement of a center of the eyeball, for example, a pupil has drastically changed. In other words, it is possible to determine that an eye is an eye of a living person as long as a saccade is detected. Therefore, in a case where the living body detection process is performed by detecting the saccade, it is desirable to control AE to obtain luminance that allows easy detection of the center of the pupil, or shorten the shutter speed to suppress a blur. Therefore, the imaging condition controller 330 instructs the imaging controller 301 to use exposure that allows easy detection of the center of the pupil when the living body detector 340 analyzes whether or not a saccade has occurred from the image data.

For example, the living body detector 340 analyzes whether or not a blinking has occurred by using the image data generated by the solid state imaging device 1. In other words, it is possible to determine that an eye is an eye of a living person as long as a blinking is detected. The living body detector 340 is able to analyze whether or not blinking has occurred by detecting temporal change in the number of pixels of an edge point of an eyelid or a pupil. Therefore, in a case where the living body detection process is performed by detecting the blinking, it is desirable to control AE to obtain luminance that allows easy detection of the edge of the eyelid or the pupil, or shorten the shutter speed to suppress a blur. Therefore, the imaging condition controller 330 instructs the imaging controller 301 to use exposure that allows easy detection of the edge of the eyelid or the pupil when the living body detector 340 analyzes whether or not blinking has occurred from the image data.

For example, the living body detector 340 performs eye tracking by using the image data generated by the solid state imaging device 1. When performing the eye tracking, the living body detector 340 uses a positional relation between an inner corner of an eye or a Purkinje image and a pupil. For example, the information processing apparatus 300 instructs a person to be subjected to living body detection to move his/her gaze, and determines whether or not the person is a living person by detecting whether the person has moved his/her gaze. In a case where the living body detection process is performed through the eye tracking, it is desirable to control AE to obtain luminance that allows easy detection of the Purkinje image or the pupil, or shorten the shutter speed to suppress a blur. Therefore, the imaging condition controller 330 instructs the imaging controller 301 to use exposure that allows easy detection of the Purkinje image or the pupil when the living body detector 340 performs the eye tracking by using the image data.

For example, the living body detector 340 analyzes unevenness of a face by using the image data generated by the solid state imaging device 1. When detecting the unevenness of the face, the living body detector 340 captures images while changing focus. For example, a method of measuring a three-dimensional shape by a method called a shape-from-focus/defocus method has been known. The living body detector 340 detects the unevenness of the face in the image data by using such a method. In a case of detecting the unevenness of the face, it is desirable to control the focus to capture the unevenness of the face in a short time. Therefore, when the living body detector 340 detects the unevenness of the face from the image data, the imaging condition controller 330 instructs the lens module 1001 to control its focus to capture the unevenness of the face in a short time.

The living body detector 340 determines whether a subject included in image data is a living body by using one of the living body detection processes described above or by combining two or more living body detection processes described above. In a case of determining whether the subject is a living body by combining two or more living body detection processes described above, it is also possible for the living body detector 340 to parallelly perform determination processes that use similar imaging conditions. For example, in a case where the living body detector 340 determines whether the subject is a living body from pupillary hippus and a saccade, it is possible to parallelly perform a living body detection process using the pupillary hippus and a living body detection process using the saccade if it is possible to accurately detect centers or positions of pupils under the same imaging conditions.

The information processing apparatus 300 according to the present embodiment completes the control related to the focus and exposure in the solid state imaging device 1. This enables control by an interruption or data access by using internal memory of the solid state imaging device 1. In addition, the information processing apparatus 300 according to the present embodiment is able to avoid delay in communication between chips such as I2C. As described above, by completing the control related to the focus and exposure in the solid state imaging device 1, it is possible for the information processing apparatus 300 according to the present embodiment to shorten time it takes to complete the control to prepare the appropriate imaging conditions for the living body detection processes, in a way similar to the above-described iris authentication process. In addition, the information processing apparatus 300 according to the present embodiment is able to improve accuracy of the living body detection process by capturing an image under the appropriate imaging conditions for the living body detection process.

It is also possible for the information processing apparatus 300 according to the present embodiment to perform both the iris authentication process and the living body detection process. By sequentially performing the iris authentication process and the living body detection process, it is possible for the information processing apparatus 300 to determine whether a subject is a living body and whether iris information of the living body is identical to pre-registered information. The information processing apparatus 300 may perform the iris authentication process and the living body detection process in this order, or may perform the living body detection process and the iris authentication process in this order. Because it takes time to perform the matching process of checking against the pre-registered information in the iris authentication process, it is possible for the information processing apparatus 300 to shorten the process time in a case where the subject is not a living body, by performing the living body detection process first, and then canceling the iris authentication process if the subject is not a living body.

FIG. 18 is an explanatory diagram illustrating a configuration example of the information processing apparatus 300 according to the present embodiment. FIG. 18 illustrates an example in which the information processing apparatus 300 is configured to perform both the living body detection process and the iris authentication process. Note that, the application processor 370 and the display 380 are omitted in FIG. 18.

The solid state imaging device 1 included in the information processing apparatus 300 illustrated in FIG. 18 includes both the iris authenticator 310 described with reference to FIG. 15 and the living body detector 340 described with reference to FIG. 17. As described above, of course, it is possible for the solid state imaging device 1 to perform both the living body detection process and the iris authentication process.

The solid state imaging device 1 may perform the living body detection process and the iris authentication process on an image of a same frame, or may perform the living body detection process and the iris authentication process on images of different frames. To improve security strength, it is desirable for the solid state imaging device 1 to perform the living body detection process and the iris authentication process on images of, for example, successive frames or images of frames obtained at a short time interval in a case of performing the living body detection process and the iris authentication process on images of different frames. In addition, the solid state imaging device 1 may perform the living body detection process and the iris authentication process under the same imaging conditions. Alternatively, the solid state imaging device 1 may perform the living body detection process and the iris authentication process under different imaging conditions because optimal image data is not necessarily obtained in the living body detection process and the iris authentication process under the same imaging conditions.

In a case of the iris authentication process, a near-infrared image is captured by using a visible light cut filter that blocks visible light, an infrared LED that emits infrared light, and the like. On the other hand, when a normal image is captured, an image of visible light is captured by using an IR cut filter that blocks infrared light. Therefore, in a case where a smartphone or the like performs the iris authentication process, the smartphone often includes two solid state imaging devices, which are a solid state imaging device for capturing normal images and a solid state imaging device for capturing images for the iris authentication process, to capture both the normal images and the images for the iris authentication process.

On the other hand, there are technologies of capturing both normal images and near-infrared images by using a single solid state imaging device. Specifically, such technologies include a technology of mechanically switching between a visible light cut filter and an IR filter to capture both normal images and near-infrared images, and a technology of including both normal RGB pixels for capturing an image of a visible light region and pixels using color filters that transmit a near-infrared region, to form a pixel array that captures both normal images and near-infrared images. In addition, such technologies also include a technology of applying voltage to an organic thin film and changing a sensitive wavelength range. Therefore, as described above, it is possible for the solid state imaging device to operate in both an optimal control mode for the iris authentication process and an optimal control mode for capturing normal images as long as the solid state imaging device is the solid state imaging device that is able to capture both normal images and near-infrared images.

FIG. 19 is an explanatory diagram illustrating a configuration example of the information processing apparatus 300 including the solid state imaging device 1 according to the present embodiment. FIG. 19 illustrates the configuration example of the information processing apparatus 300 including the solid state imaging device 1 that is able to operate in both the optimal control mode for the iris authentication process and the optimal control mode for capturing normal images. Next, the configuration example of the information processing apparatus 300 according to the present embodiment will be described with reference to FIG. 19.

As illustrated in FIG. 19, the information processing apparatus 300 according to the present embodiment includes the lens module 1001 and the solid state imaging device 1 that converts light passed through the lens module 1001 into an electrical signal.

The solid state imaging device 1 includes the imaging controller 301, the iris authenticator 310, the iris information storage 320, the imaging condition controller 330, and an analyzer 350. Here, the analyzer 350 that is not included in the solid state imaging device 1 illustrated in FIG. 15 will be described.

The analyzer 350 analyzes image data obtained by the solid state imaging device 1 when a normal image is captured. Specifically, the analyzer 350 measures luminance and contrast of the image data obtained by the solid state imaging device 1. Next, the analyzer 350 sends an analysis result of the image data to the imaging condition controller 330. The imaging condition controller 330 uses the analysis result sent from the analyzer 350 and performs control to cause the lens module 1001 to drive the actuator and to adjust a shutter speed, gain, and the like of the imaging controller 301 to obtain appropriate exposure.

As described above, it is possible to quickly set imaging conditions appropriate in a case of capturing a normal image and imaging conditions appropriate in a case of performing the iris authentication process, by image data obtained by the solid state imaging device 1 being analyzed by the solid state imaging device 1 that is able to operate in both the optimal control mode for the iris authentication process and the optimal control mode for capturing normal images.

The example in which the iris authentication process is performed in the solid state imaging device 1 has been described above. However, it is also possible to perform extraction of iris information and processes before extraction of iris information in the solid state imaging device 1, and perform the matching process of checking the extracted iris information against pre-registered iris information in the application processor in a rear stage or in a server coupled via a network. Examples of cases suitable for the matching process performed outside the solid state imaging device 1 include a case where a data size of feature amount extracted by combining facial recognition and the like is large, a case where a large amount of calculation is necessary for a matching process because of an algorithm, a case of a system that searches for corresponding information in a database that stores large amounts of data, and the like. In a case where the matching process of checking against the extracted iris information against pre-registered iris information is performed in the application processor in the rear stage or in the server coupled via the network, there is a possibility that the iris information is leaked if the solid state imaging device 1 outputs the iris information as it is.

Here, as described above, the solid state imaging device 1 is able to perform the encryption process by using information generated therein as a key. Therefore, in a case where the matching process is performed outside the solid state imaging device 1, it is possible for the solid state imaging device 1 to safely exchange the iris information by outputting encrypted iris information.

FIG. 20 is an explanatory diagram illustrating a configuration example of an iris authentication system. FIG. 20 illustrates the iris authentication system in which the information processing apparatus 300 and a server 800 are coupled via a network 900. The information processing apparatus 300 performs the extraction of iris information and the processes before the extraction of iris information. The server 800 performs the matching process of the iris information. The solid state imaging device 1 illustrated in FIG. 20 includes the imaging controller 301, an iris processor 302, an encryption processor 315, and the imaging condition controller 330. The iris processor 302 includes the region detector 311 and the iris extractor 312. In other words, the iris processor 302 performs the extraction of iris information and the processes before the extraction of iris information.

The encryption processor 315 performs an encryption process on iris information outputted from the iris processor 302. The encryption processor 315 performs the encryption process by using unique information specific to the solid state imaging device 1 as described above. It is possible for the encryption processor 315 to very securely exchange information with an outside by performing the encryption process using unique information specific to the solid state imaging device 1.

The server 800 includes a decryption processor 810, an iris matching section 820, and an iris information storage 830.

The decryption processor 810 decrypts iris information encrypted by the encryption processor 315. The server 800 previously acquires unique information specific to the solid state imaging device 1 from the information processing apparatus 300 through any method. The decryption processor 810 decrypts the encrypted iris information by using the unique information acquired from the information processing apparatus 300.

In a way similar to the above-described iris matching section 313, the iris matching section 820 checks the iris information acquired from the information processing apparatus 300 against the iris information stored in advance in the iris information storage 830.

As described above, even in a case where the information processing apparatus 300 transmits iris information to the server 800 and the server 800 performs the iris authentication process, it is possible to control the focus and exposure in the solid state imaging device 1 by using information obtained through the process of extracting iris information in the solid state imaging device 1.

Here, a specific circuit configuration example of the above-described solid state imaging device 1 will be described. FIG. 21 is an explanatory diagram illustrating a configuration example of a circuit formed in the logic die 23024 included in the solid state imaging device 1 according to the present embodiment.

The logic die 23024 includes a communication section 23201, a CPU 23202, ROM 23203, RAM 23204, an image processor 23205, and the above-described imaging controller 301. In addition, the logic die 23024 includes a secure region 23300. The communication section 23201 communicates with another element, e.g., the application processor, via I2C communication, for example. In addition, pixel data is sent from, for example, a pixel region 23102 to the image processor 23205, for example.

In addition, the secure region 23300 includes a CPU 23301, ROM 23302, RAM 23303, non-volatile memory (NVM) 23304, the above-described encryptor 222, and the above-described iris authenticator 310. The iris authenticator 310 includes RAM 23104.

Of course, needless to say, the circuit configuration example illustrated in FIG. 21 is for illustrative purposes. It is possible for the logic die 23024 included in the solid state imaging device 1 to have various kinds of layouts.

1.5.3. Operation Example

Next, an operation example of the solid state imaging device 1 according to the embodiment of the present disclosure will be described. Hereinafter, an operation example of the solid state imaging device 1 will be described. In the operation example, the solid state imaging device 1 first operates in a living body detection mode and then operates in an iris authentication mode when identifying an individual by using image data obtained through image capturing. In the living body detection mode, the living body detection process is performed. In the iris authentication mode, the iris authentication process is performed in a case where the living body is detected through the living body detection process.

FIG. 22 is a flowchart illustrating an operation example of the solid state imaging device 1 according to the present embodiment. FIG. 22 illustrates an operation example of the solid state imaging device 1 operating in the living body detection mode.

When the solid state imaging device 1 operates in the living body detection mode, the solid state imaging device 1 first controls image capturing appropriately for living body detection by using image data that has been obtained. In other words, the solid state imaging device 1 sets exposure, gain, and the like appropriately for living body detection (Step S301).

If image capturing is controlled appropriately for living body detection and imaging conditions appropriate for the living body detection are obtained (YES in Step S302), the solid state imaging device 1 performs the living body detection process by using the image data that has been obtained, and determines whether a subject is a living body (Step S303). If the subject in the image is the living body as a result of the living body detection (YES in Step S303), the solid state imaging device 1 subsequently shifts to the iris authentication mode. On the other hand, if the subject in the image is not the living body as a result of the living body detection (NO in Step S303), the solid state imaging device 1 waits for time-out (Step S304). In a case where the time-out occurs (YES in Step S304), the solid state imaging device 1 determines that the individual identification through the living body detection has failed, and ends the process (Step S305). Note that, if the imaging conditions are not appropriate for the living body detection as a result of the determination in Step S302 (NO in Step S302), the solid state imaging device 1 waits for the time-out (Step S306). In a case where the time-out occurs (YES in Step S306), the solid state imaging device 1 determines that the individual identification through the living body detection has failed, and ends the process (Step S305).

Here, in the time-out process in Steps S304 and S306, it is possible to install a timer in the solid state imaging device 1 and end the living body detection process when the process is interrupted by the timer that has finished counting a predetermined time-out period, or it is possible to install the timer in the application processor 370 and end the living body detection process when the timer finishes counting the predetermined time-out period and the application processor 370 notifies the solid state imaging device 1 of the time-out.

FIG. 23 is a flowchart illustrating an operation example of the solid state imaging device 1 according to the present embodiment. FIG. 23 illustrates an operation example of the solid state imaging device 1 operating in the iris authentication mode.

When the solid state imaging device 1 operates in the iris authentication mode, the solid state imaging device 1 first controls image capturing appropriately for the iris authentication by using image data that has been obtained. In other words, the solid state imaging device 1 sets exposure, gain, and the like appropriately for the iris authentication (Step S311).

If image capturing is controlled appropriately for the iris authentication and imaging conditions appropriate for the iris authentication are obtained (YES in Step S312), the solid state imaging device 1 performs the iris authentication process by using the image data that has been obtained, and determines whether iris information of a subject is identical to the pre-registered iris information (Step S313). If the iris information of the subject is identical to the pre-registered iris information as a result of the iris authentication (YES in Step S313), the solid state imaging device 1 recognizes the subject as the person to be authenticated, and ends the process (Step S314). On the other hand, if the iris information of the subject is not identical to the pre-registered iris information as a result of the iris authentication (NO in Step S313), the solid state imaging device 1 waits for time-out (Step S315). In a case where the time-out occurs (YES in Step S315), the solid state imaging device 1 determines that the individual identification through the iris authentication has failed, and ends the process (Step S316). Note that, if the imaging conditions are not appropriate for the iris authentication as a result of the determination in Step S312 (NO in Step S312), the solid state imaging device 1 waits for the time-out (Step S317). In a case where the time-out occurs (YES in Step S317), the solid state imaging device 1 determines that the individual identification through the iris authentication has failed, and ends the process (Step S316).

Here, in the time-out process in Steps S315 and S317, it is possible to install a timer in the solid state imaging device 1 and end the iris authentication process when the process is interrupted by the timer that has finished counting a predetermined time-out period, or it is possible to install the timer in the application processor 370 and end the iris authentication process when the timer finishes counting the predetermined time-out period and the application processor 370 notifies the solid state imaging device 1 of the time-out.

2. Conclusion

As described above, the embodiment of the present disclosure provides the solid state imaging device 1 that is able to shorten time it takes to complete the control to prepare the appropriate imaging conditions for the iris authentication process, by setting appropriate imaging conditions for the iris authentication process and the biometric authentication process in the solid state imaging device 1.

The preferred embodiments of the present disclosure have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

It may not be necessary for each step in the processes executed by each apparatus or device in the present specification to be performed in a time series process, in accordance with the order described in the sequence diagrams or flow charts. For example, each step in the processes executed by each apparatus or device may be performed in an order different from the order described by the flow charts or may be performed in parallel.

Further, it is possible to create a computer program for causing hardware, such as a CPU, ROM and RAM built-into each apparatus or device, to exhibit functions similar to the configurations of each of the above described apparatuses or devices. Further, it is also possible to provide a storage medium storing this computer program. Further, a series of processes is able to be executed with the hardware, by configuring each of the functional blocks illustrated by the functional block diagrams with the hardware.

In addition, the effects described in the present specification are merely illustrative and demonstrative, and not limitative. In other words, the technology according to the present disclosure may exhibit other effects that are evident to those skilled in the art from the present specification, along with or instead of the above effects.

Note that the technical scope of the present disclosure also includes the following configurations.

(1)
A solid state imaging device including:
a pixel array in which pixels are disposed on a matrix;
an iris authenticator that extracts iris information to be used in an iris authentication process, from image data obtained from the pixel array through photoelectric conversion; and
an imaging condition controller that performs control to set an imaging condition in obtaining the image data for the iris authentication process, by using information obtained in a process of extracting the iris information.

(2)
The solid state imaging device according to (1), in which the imaging condition controller performs control to set exposure in obtaining the image data, as the imaging condition.

(3)
The solid state imaging device according to (1), in which the imaging condition controller controls a focus in obtaining the image data, as the imaging condition.

(4)
The solid state imaging device according to any one of (1) to (3), in which the iris authenticator includes an iris extractor that extracts iris information from the image data.

(5)
The solid state imaging device according to (4), in which the iris authenticator includes a region detector that detects a region including iris information, from the image data, and the iris extractor extracts iris information from the region detected by the region detector.

(6)
The solid state imaging device according to (4) or (5), in which the iris authenticator further includes an iris matching section that executes an iris authentication process using iris information extracted by the iris extractor.

(7)
The solid state imaging device according to any one of (1) to (6), further including an encryption processor that encrypts iris information extracted by the iris authenticator.

(8)
The solid state imaging device according to (7), in which the encryption processor performs encryption by using unique information acquired from the pixel array.

(9)
The solid state imaging device according to any one of (1) to (8), in which two or more semiconductor substrates are joined.

(10)
The solid state imaging device according to (9), in which the semiconductor substrates include a first semiconductor substrate on which at least the pixel array is formed, and a second semiconductor substrate on which at least a logic circuit is formed.

(11)
The solid state imaging device according to (10), in which the iris authenticator and the imaging condition controller are formed in the logic circuit.

(12)
The solid state imaging device according to (10) or (11), in which a wiring line of the first semiconductor substrate and a wiring line of the second semiconductor substrate are directly joined.

(13)
A solid state imaging device including:
a first semiconductor substrate on which at least a pixel array is formed; and
a second semiconductor substrate on which at least a logic circuit is formed, the second semiconductor substrate being joined to the first semiconductor substrate,
the pixel array including pixels disposed on a matrix, the pixel array outputting image data,
the logic circuit including
an iris authenticator that extracts iris information from the image data, and
an imaging condition controller that controls exposure or a focus on a basis of a result obtained by the iris authenticator.

(14)
A method of controlling a solid state imaging device, the method including:
extracting iris information to be used in an iris authentication process, from image data obtained from a pixel array through photoelectric conversion, the pixel array including pixels disposed on a matrix; and
performing control to set an imaging condition in obtaining the image data for the iris authentication process, by using information obtained in a process of extracting the iris information.

REFERENCE SIGNS LIST 1 solid state imaging device
300 information processing apparatus
380 display
381 guide
390 light source
800 server
900 network

The invention claimed is:
1. A solid state imaging device comprising:
a pixel array in which pixels are disposed on a matrix;
an imaging controller configured to obtain first image data from the pixel array through photoelectric conversion;
an iris authenticator that extracts iris information from the first image data, the iris information to be used in an iris authentication process; and
an imaging condition controller configured to
obtain information from the iris authenticator extracting the iris information from the first image data, and
set an imaging condition in the imaging controller based on the information obtained from the iris authenticator,
wherein the imaging controller is further configured to obtain second image data from the pixel array through the photoelectric conversion, the second image data being different from the first image data by the imaging condition that is set.

2. The solid state imaging device according to claim 1, wherein the imaging condition is an exposure condition.

3. The solid state imaging device according to claim 1, wherein the imaging condition is further configured to set a focus condition in a lens module based on the information obtained from the iris authenticator.

4. The solid state imaging device according to claim 1, wherein the iris authenticator includes an iris extractor that extracts the iris information from the first image data.

5. The solid state imaging device according to claim 4, wherein
the iris authenticator includes a region detector that detects a region including the iris information, from the first image data, and the iris extractor extracts the iris information from the region detected by the region detector.

6. The solid state imaging device according to claim 4, wherein the iris authenticator further includes an iris matching section that executes the iris authentication process using the iris information extracted by the iris extractor.

7. The solid state imaging device according to claim 1, further comprising:
an encryption processor that encrypts the iris information extracted by the iris authenticator.

8. The solid state imaging device according to claim 7, wherein the encryption processor is further configured to
acquire unique information from the pixel array, and
perform encryption on the iris information based on the unique information.

9. The solid state imaging device according to claim 1, wherein two or more semiconductor substrates are joined.

10. The solid state imaging device according to claim 9, wherein the two or more semiconductor substrates include a first semiconductor substrate on which at least the pixel array is formed, and a second semiconductor substrate on which at least a logic circuit is formed.

11. The solid state imaging device according to claim 10, wherein the iris authenticator, the imaging controller, and the imaging condition controller are formed in the logic circuit.

12. The solid state imaging device according to claim 10, wherein a wiring line of the first semiconductor substrate and a wiring line of the second semiconductor substrate are directly joined.

13. A solid state imaging device comprising:
a first semiconductor substrate on which at least a pixel array is formed; and
a second semiconductor substrate on which at least a logic circuit is formed, the second semiconductor substrate being joined to the first semiconductor substrate,
the pixel array including pixels disposed on a matrix,
the logic circuit including
an imaging controller configured to obtain first image data from the pixel array through photoelectric conversion,
an iris authenticator that extracts iris information from the first image data, the iris information to be used in an iris authentication process, and
an imaging condition controller configured to
obtain information from the iris authenticator extracting the iris information from the first image data, and
set an exposure condition in the imaging controller based on the information obtained from the iris authenticator,
wherein the imaging controller is further configured to obtain second image data from the pixel array through the photoelectric conversion, the second image data being different from the first image data by the exposure condition that is set.

14. The solid state imaging device according to claim 13, wherein a wiring line of the first semiconductor substrate and a wiring line of the second semiconductor substrate are directly joined.

15. The solid state imaging device according to claim 13, wherein the first semiconductor substrate and the second semiconductor substrate are joined together and are also joined to one or more additional semiconductor substrates.

16. The solid state imaging device according to claim 13, wherein the logic circuit further includes an encryption processor that encrypts the iris information extracted by the iris authenticator.

17. The solid state imaging device according to claim 16, wherein the encryption processor is further configured to
acquire unique information from the pixel array, and
perform encryption on the iris information based on the unique information.

18. A method of controlling a solid state imaging device, the method comprising:
obtaining, with an imaging controller, first image data from a pixel array through photoelectric conversion, the pixel array including pixels disposed on a matrix;
extracting, with an iris authenticator, iris information to be used in an iris authentication process, from the first image data;
obtaining, with an imaging condition controller, information from the extraction of the iris information by the iris authenticator;
setting, with the imaging condition controller, an imaging condition in the imaging controller based on the information obtained from the extraction of the iris information; and
obtaining, with the imaging controller, second image data from the pixel array through the photoelectric conversion, the second image data being different from the first image data by the imaging condition that is set.

19. The method according to claim 18, wherein the imaging condition is an exposure condition.

20. The method according to claim 18, further comprising:
setting a focus condition in a lens module based on the information obtained from the iris authenticator; and
obtaining, with the imaging controller, third image data from the pixel array through the photoelectric conversion, the third image data being different from the first image data by the imaging condition that is set and the focus condition that is set, the third image data being different from the second image data by the focus condition that is set.

* * * * *